(12) United States Patent
Kitahara et al.

(10) Patent No.: US 11,330,344 B2
(45) Date of Patent: May 10, 2022

(54) RECEIVING APPARATUS, TRANSMITTING APPARATUS, AND DATA PROCESSING METHOD

(71) Applicant: SATURN LICENSING LLC, New York, NY (US)

(72) Inventors: Jun Kitahara, Shizuoka (JP); Naohisa Kitazato, Tokyo (JP); Yasuaki Yamagishi, Kanagawa (JP); Taketoshi Yamane, Kanagawa (JP)

(73) Assignee: SATURN LICENSING LLC, New York, NY (US)

( * ) Notice: Subject to any disclaimer, the term of this patent is extended or adjusted under 35 U.S.C. 154(b) by 0 days.

(21) Appl. No.: 15/743,712

(22) PCT Filed: Aug. 18, 2016

(86) PCT No.: PCT/JP2016/074106
§ 371 (c)(1),
(2) Date: Jan. 11, 2018

(87) PCT Pub. No.: WO2017/038482
PCT Pub. Date: Mar. 9, 2017

(65) Prior Publication Data
US 2018/0213298 A1   Jul. 26, 2018

(30) Foreign Application Priority Data

Sep. 1, 2015 (JP) .............................. JP2015-172366

(51) Int. Cl.
*H04N 21/81* (2011.01)
*H04N 21/235* (2011.01)
(Continued)

(52) U.S. Cl.
CPC .......... *H04N 21/814* (2013.01); *H04H 20/28* (2013.01); *H04H 20/59* (2013.01); *H04N 21/235* (2013.01);
(Continued)

(58) Field of Classification Search
CPC ........ H04H 20/28; H04H 20/59; H04H 60/82; H04N 21/235; H04N 21/431;
(Continued)

(56) References Cited

U.S. PATENT DOCUMENTS 7,308,697 B1 * 12/2007 Jerding .............. H04N 21/4314
348/E7.063
2002/0175924 A1 * 11/2002 Yui .......................... G06F 3/14
345/660

(Continued)

FOREIGN PATENT DOCUMENTS

CN    101355582 B    8/2011
CN    103703764 A    4/2014
(Continued)

OTHER PUBLICATIONS

International Search Report dated Nov. 22, 2016 in PCT/JP2016/074106 filed Aug. 18, 2016.
(Continued)

*Primary Examiner* — Randy A Flynn
(74) *Attorney, Agent, or Firm* — Jeffery J Brosemer

(57) ABSTRACT

This technology relates to a receiving apparatus, a transmitting apparatus, and a data processing method for displaying emergency information communicated in an emergency at appropriate positions.

The receiving apparatus acquires metadata transmitted by a digital broadcast signal, the metadata including first emergency information required to be announced urgently and display position information indicating whether there is (Continued)

second emergency information embedded in uncompressed video data, the display position information further indicating, if the second emergency information is embedded in the uncompressed video data, the display position of the second emergency information on a screen. The receiving apparatus processes the metadata to determine whether the second emergency information is embedded in the uncompressed video data and, if the second emergency information is embedded in the uncompressed video data, displays the first emergency information at a position different from the display position of the second emergency information on the screen. This technology applies to television receivers, for example.

13 Claims, 14 Drawing Sheets

(51) Int. Cl.
*H04H 20/59* (2008.01)
*H04H 20/28* (2008.01)
*H04N 21/431* (2011.01)
*H04N 21/435* (2011.01)
*H04N 21/488* (2011.01)
*H04H 60/82* (2008.01)
*H04N 21/643* (2011.01)

(52) U.S. Cl.
CPC ......... *H04N 21/431* (2013.01); *H04N 21/435* (2013.01); *H04N 21/4316* (2013.01); *H04N 21/4882* (2013.01); *H04H 60/82* (2013.01); *H04N 21/64322* (2013.01)

(58) Field of Classification Search
CPC ............ H04N 21/4316; H04N 21/435; H04N 21/4882; H04N 21/64322; H04N 21/814
USPC ............................... 725/33; 375/E7.024, 272
See application file for complete search history.

(56) References Cited

U.S. PATENT DOCUMENTS

| | | | |
|---|---|---|---|
| 2003/0237092 A1 | 12/2003 | Suzuki | |
| 2006/0015898 A1* | 1/2006 | Kim | H04N 21/814 |
| | | | 725/33 |
| 2006/0020964 A1* | 1/2006 | Yun | H04N 21/814 |
| | | | 725/33 |
| 2006/0059512 A1* | 3/2006 | Pugel | G08B 25/085 |
| | | | 725/33 |
| 2007/0094680 A1* | 4/2007 | Kim | H04N 21/814 |
| | | | 725/33 |
| 2008/0120645 A1* | 5/2008 | Yun | H04N 21/435 |
| | | | 725/33 |
| 2010/0122284 A1* | 5/2010 | Yoon | H04N 21/435 |
| | | | 725/33 |
| 2011/0037590 A1* | 2/2011 | Kannan | H04H 20/59 |
| | | | 340/539.13 |
| 2013/0191861 A1* | 7/2013 | Sasaki | H04N 21/4882 |
| | | | 725/32 |
| 2013/0242847 A1* | 9/2013 | Oh | H04H 20/71 |
| | | | 370/312 |
| 2014/0270505 A1* | 9/2014 | McCarthy | H04N 19/117 |
| | | | 382/165 |
| 2016/0127439 A1* | 5/2016 | Ginnela | H04W 4/90 |
| | | | 455/404.1 |
| 2017/0207867 A1* | 7/2017 | Kwon | H04H 20/59 |

FOREIGN PATENT DOCUMENTS

| | | | | |
|---|---|---|---|---|
| CN | 104798378 A | | 7/2015 | |
| EP | 1 104 128 A1 | | 5/2001 | |
| EP | 1104128 | * | 5/2001 | ............. H04H 1/100 |
| EP | 2 866 436 A1 | | 4/2015 | |
| JP | 2001-313911 A | | 11/2001 | |
| JP | 2012-15930 A | | 1/2012 | |
| JP | 2013-9335 A | | 1/2013 | |
| JP | 2015-104055 A | | 6/2015 | |
| TW | 201112737 A1 | | 4/2011 | |
| TW | I470993 B | | 1/2015 | |
| WO | WO 2005/067285 A2 | | 7/2005 | |
| WO | WO 2013/021643 A1 | | 2/2013 | |

OTHER PUBLICATIONS

Extended European Search Report dated Dec. 13, 2018 in European Patent Application No. 16841514.9, 8 pages.
ATSC Mobile DTV Standard: A/153 Part 10, Mobile Emergency Alert System (A/153 Part 10:2013), ATSC Advanced Television Systems Committee, XP 055178642, Mar. 11, 2013, pp. 1-20.

\* cited by examiner

FIG. 6

| Element/Attribute (with @) | Card. | Data Type | Description |
|---|---|---|---|
| EAT | | | |
| AutomaticTuningService | 0..1 | | Automatic tuning service(ATS) when wake-up |
| @broadcastStreamId | 0..1 | integer | BroadcastStream ID for ATS |
| @serviceId | 1 | integer | Service ID for ATS |
| BurnedInMessageRegion | 0..n | | Position of burned-in message (e.g. coordinates, upper/middle/bottom, etc.) |
| @type | 0..1 | | |
| MessageLayoutPolicy | 0..1 | | Layout of EaBannerMessage(e.g. overlay, scaling, etc.) |
| EaMessage | 0..n | | Emergency alert message |
| @eaMessageId | 1 | integer | Emergency alert message ID |
| @eaCategory | 1 | integer | Category of emergency alert |
| EaGeolocation | 0..n | | Geo-location information |
| @type | 0..1 | string | Type of area code(zip, latitude/longitude, etc.) |
| EaBannerMessage | 0..1 | | Emergency alert message data |
| @type | 0..1 | string | Message data type(CAP, text, EEE code, HTML, etc.) |
| EaBannerDescription | 0..n | | |
| SpeechInfo | 0..1 | | Emergency Alert Speech Information for EaBannerMessage and EaBannerDescription |
| @content-type | 0..1 | | Speech information representation type (SSML, etc.) |
| @content-enc | 0..1 | | Compressed form (zip, etc.) |
| SpeechInfoURI | 0..1 | | URI address for Emergency Alert Speech Information |
| @content-type | 0..1 | | Speech information representation type (SSML, etc.) |
| @content-enc | 0..1 | | Compressed form (zip, etc.) |
| EaApplication | 0..1 | | Emergency alert application |
| @applicationId | 1 | integer | Application ID of Emergency Application |
| EaService | 0..1 | | Emergency alert app-based service |
| @serviceId | 1 | integer | service ID of Emergency alert service |
| EaAudio | 0..1 | | shared audio component for emergency information |
| @id | 1 | | component id(e.g. adaptation set Id, S-TSID/ContentInfo, etc.) |
| EaWww | 0..n | | Web site of emergency alert information |
| @uri | 1 | anyURI | URI of emergency alert information |

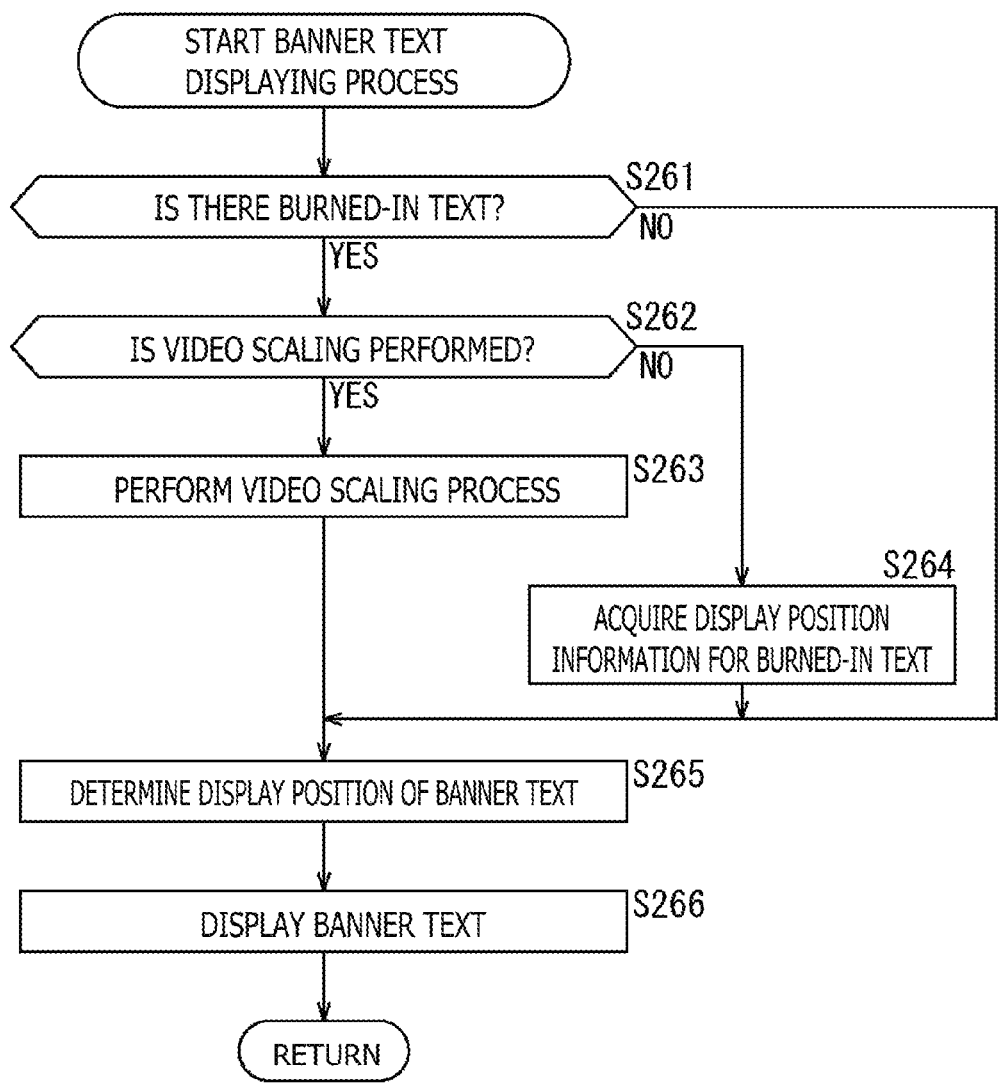

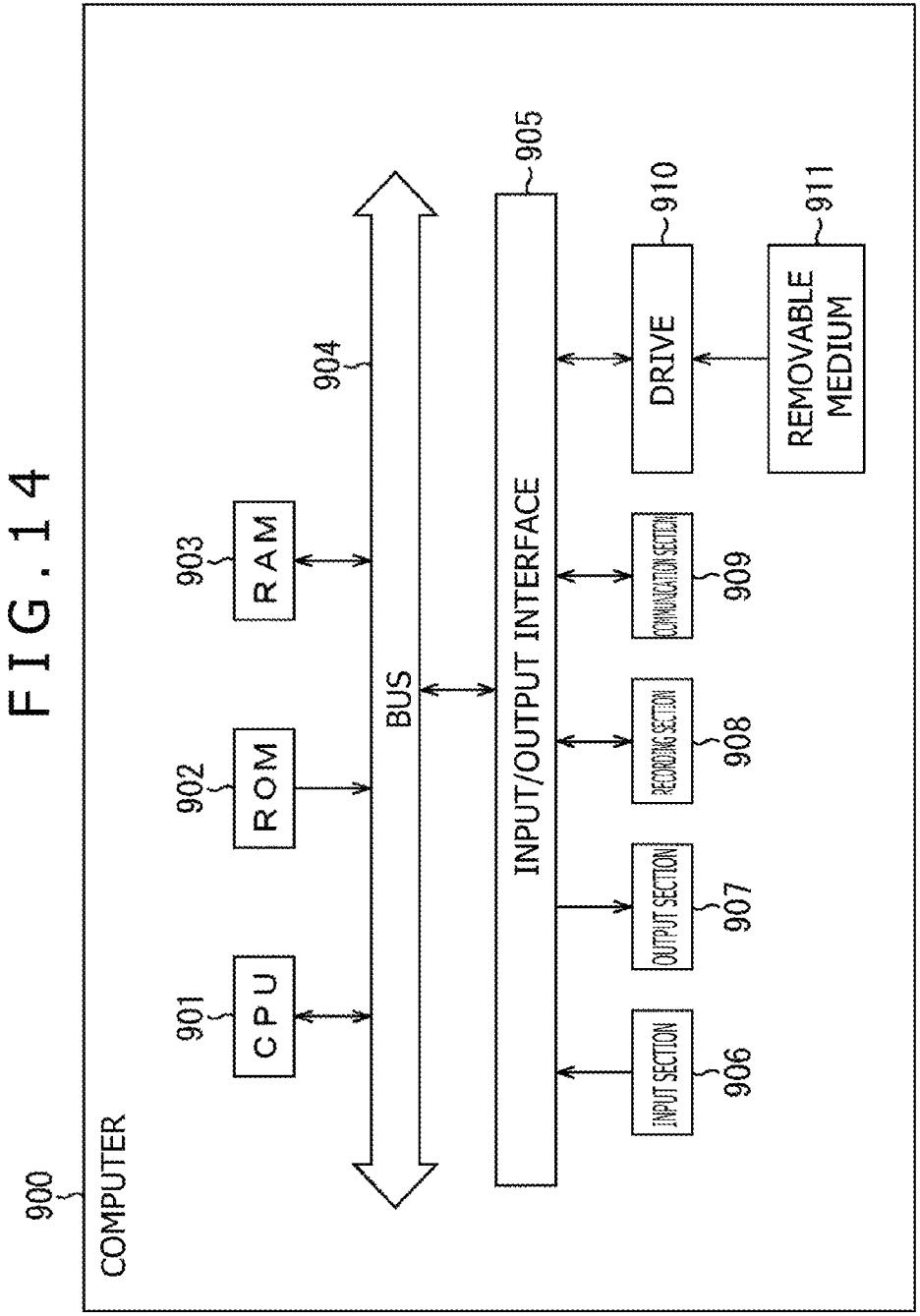

RECEIVING APPARATUS, TRANSMITTING APPARATUS, AND DATA PROCESSING METHOD

TECHNICAL FIELD

The present technology relates to a receiving apparatus, a transmitting apparatus, and a data processing method. More particularly, the technology relates to a receiving apparatus, a transmitting apparatus, and a data processing method for displaying emergency information communicated in an emergency at appropriate positions.

BACKGROUND ART

In the field of digital broadcasting, various proposals have been made as ways to communicate emergency information that needs to be announced urgently in an emergency (e.g., see PTL 1).

CITATION LIST

Patent Literature

[PTL 1]
 JP 2015-104055A

SUMMARY

Technical Problem

Where emergency information is to be communicated by multiple methods in an emergency, there is a possibility that the emergency information may not be displayed at appropriate positions. Thus there has been a need for proposals as ways to display the emergency information in an appropriately positioned manner.

The present technology has been devised in view of the above circumstances. An object of the technology is therefore to provide means for displaying emergency information communicated in an emergency at appropriate positions.

Solution to Problem

According to a first aspect of the present technology, there is provided a receiving apparatus including: a receiving section configured to receive a digital broadcast signal; an acquiring section configured to acquire metadata transmitted by the digital broadcast signal, the metadata including first emergency information required to be announced urgently and display position information indicating whether there is second emergency information embedded in uncompressed video data, the display position information further indicating, if the second emergency information is embedded in the uncompressed video data, the display position of the second emergency information on a screen; and a processing section configured to process the metadata to determine whether the second emergency information is embedded in the uncompressed video data, the processing section further displaying, if the second emergency information is embedded in the uncompressed video data, the first emergency information at a position different from the display position of the second emergency information on the screen.

The receiving apparatus according to the first aspect of the present technology may be either an independent apparatus or an internal block constituting part of a single apparatus. A data processing method according to the first aspect of the present technology corresponds to the above-mentioned receiving apparatus according to the first aspect thereof.

Where the receiving apparatus and the data processing method according to the first aspect of the present technology are in use, a digital broadcast signal is received. Metadata transmitted by the digital broadcast signal is acquired, the metadata including first emergency information required to be announced urgently and display position information indicating whether there is second emergency information embedded in uncompressed video data. The display position information further indicates, if the second emergency information is embedded in the uncompressed video data, the display position of the second emergency information on a screen. The metadata is processed to determine whether the second emergency information is embedded in the uncompressed video data. If the second emergency information is embedded in the uncompressed video data, the first emergency information is displayed at a position different from the display position of the second emergency information on the screen.

According to a second aspect of the present technology, there is provided a transmitting apparatus including: a generating section configured to generate metadata including first emergency information required to be announced urgently and display position information indicating whether there is second emergency information embedded in uncompressed video data, the display position information further indicating, if the second emergency information is embedded in the uncompressed video data, the display position of a receiving apparatus on a screen; and a transmitting section configured to transmit the metadata as a digital broadcast signal.

The transmitting apparatus according to the second aspect of the present technology may be either an independent apparatus or an internal block constituting part of a single apparatus. A data processing method according to the second aspect of the present technology corresponds to the above-mentioned transmitting apparatus according to the second aspect thereof.

Where the transmitting apparatus and the data processing method according to the second aspect of the present technology are in use, metadata is generated which includes first emergency information required to be announced urgently and display position information indicating whether there is second emergency information embedded in uncompressed video data. The display position information further indicates, if the second emergency information is embedded in the uncompressed video data, the display position of a receiving apparatus on a screen. The metadata is transmitted as a digital broadcast signal.

Advantageous Effects of Invention

According to the first and the second aspects of the present technology, the emergency information communicated in an emergency is displayed at appropriate positions.

The advantageous effects outlined above are not limitative of the present disclosure. Further advantages of the disclosure will be apparent from the ensuing description.

BRIEF DESCRIPTION OF DRAWINGS

FIG. 6 is a schematic diagram depicting typical syntax of EAT metadata.

FIG. 13 is a flowchart explaining the flow of a banner text displaying process.

FIG. 14 is a schematic diagram depicting a typical configuration of a computer.

DESCRIPTION OF EMBODIMENTS

Some preferred embodiments of the present technology are described below with reference to the accompanying drawings. Note that, the description will be made under the following headings.

1. Operation of the transmission system to which the present technology is applied
2. Typical syntax
3. Configurations of apparatuses
4. Flows of processes performed by the apparatuses
5. Variations
6. Configuration of a computer <1. Operation of the Transmission System to which the Present Technology is Applied>

(Typical Configuration of the Transmission System)

Figure 1:
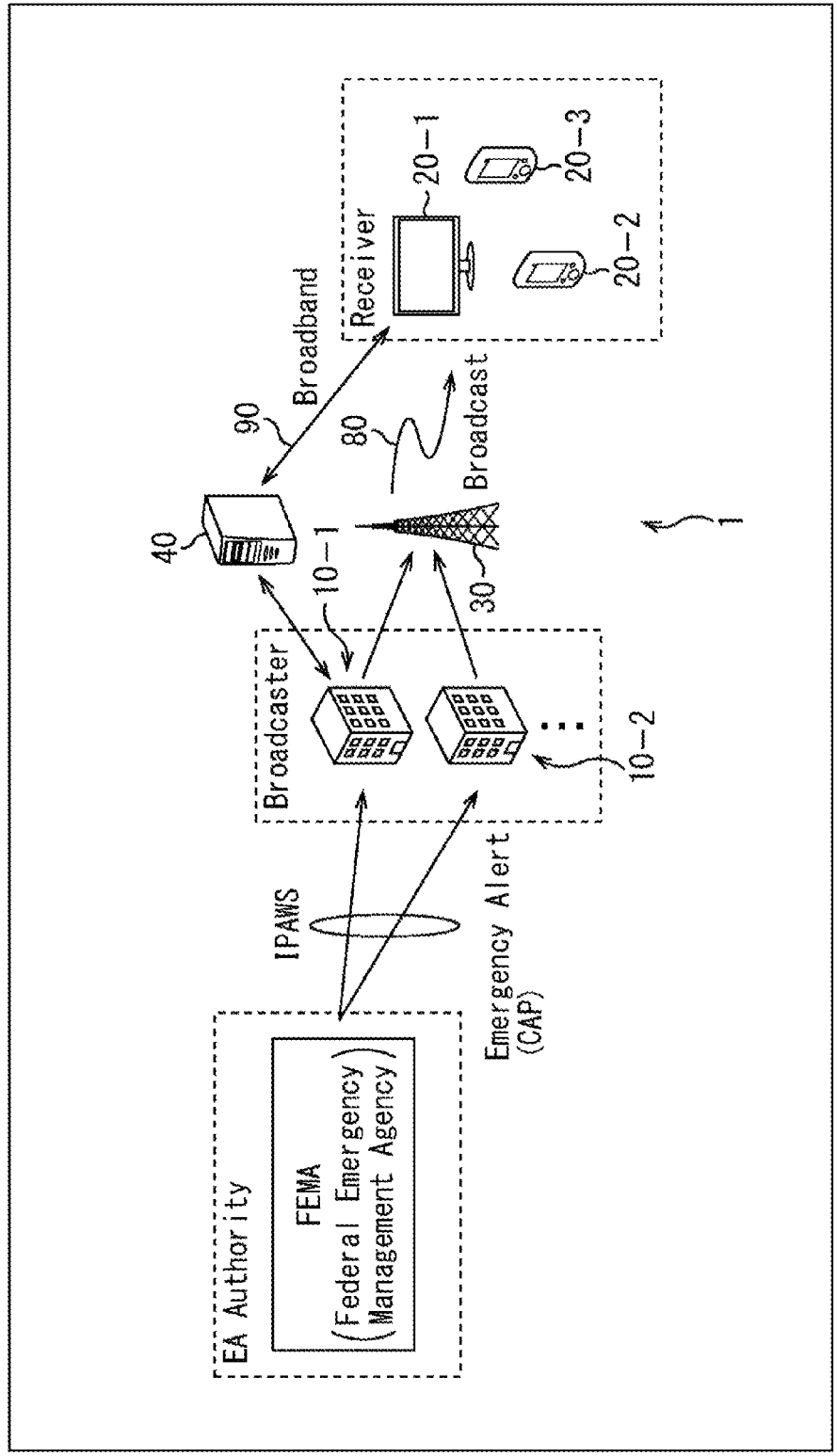
FIG. 1 is a schematic diagram depicting a typical configuration of an embodiment of a transmission system to which the present technology is applied.

FIG. 1 is a schematic diagram depicting a typical configuration of an embodiment of a transmission system to which the present technology is applied. Note that the term "system" refers to a logical aggregate of multiple apparatuses.

In a transmission system 1, each broadcast station (broadcaster) has a transmitting apparatus 10 (e.g., transmitting apparatuses 10-1 and 10-2) installed therein. The transmitting apparatus 10 transmits as a broadcast stream a digital broadcast signal including content such as television programs.

A digital broadcast signal emitted by the transmitting apparatus 10 typically via a radio tower 30 is received by the receiving apparatus 20 by way of a transmission path 80. The receiving apparatus 20 is a fixed receiver (e.g., receiving apparatus 20-1) or a mobile receiver (e.g., receiving apparatuses 20-2 and 20-3). The receiving apparatus 20 processes the broadcast stream obtained from the digital broadcast signal to reproduce the video and audio of the content such as television programs.

Also in FIG. 1, the transmission system 1 includes a configuration corresponding to an emergency announcement system called the Emergency Alerting System (EAS) set up in the United States. In an emergency, each broadcast station provides (notifies) the receiving apparatus 20 with emergency information (emergency warning information) that needs to be announced urgently.

Specifically, in the transmission system 1, emergency information source information (e.g., an emergency alert issued at the time of a natural disaster) communicated by the Federal Emergency Management Agency (FEMA) or by an emergency information source such as the White House is converted to Common Alerting Protocol (CAP) information before being conveyed to each broadcast station (i.e., to its transmitting apparatus 10) in an emergency.

Incidentally, the CAP information complies with the Common Alerting Protocol stipulated by the Organization for the Advancement of Structured Information Standards (OASIS). That is, since an emergency announcement system called the EAS is established in the United States, this system is used to let emergency information (CAP information) on diverse levels ranging from the highest-priority issue from the President to local announcements be communicated (conveyed) to various media (e.g., via broadcast or via telecommunications).

The broadcast station (its transmitting apparatus 10) generates emergency information by embedding CAP information reflecting the emergency information source information coming from an emergency information source into a television program video (uncompressed video data) and encoding it, or by converting the CAP information to a predetermined format (e.g., to EAT format, to be discussed later). The broadcast station (its transmitting apparatus 10) then transmits the generated emergency information to numerous receiving apparatuses 20 (e.g., receiving apparatuses 20-1 to 20-3) in the broadcast area.

This causes each receiving apparatus 20 to display the emergency information overlaid on the television program video. As a result, the user can verify the emergency information (e.g., text information) displayed on the screen of the receiving apparatus 20.

In the ensuing description, a term "burned-in text" will refer to the emergency information which is part of the emergency information (text information) displayed on the screen of the receiving apparatus 20 and which is embedded in a content video (uncompressed video data) such as a television program. The burned-in text may also be referred to as "burned EA message" or "EA text."

On the other hand, of the emergency information (text information) displayed on the screen of the receiving apparatus 20, the information obtained by converting the CAP information to a predetermined format (e.g., EAT metadata, to be discussed later) will be referred to as "banner text."

The broadcast station (its transmitting apparatus 10) may also generate an emergency information application (e.g., more detailed information related to emergency information) based on the CAP information reflecting the emergency information source information coming from an emergency information source, and provide the application to an EA server 40. The emergency information application may also be referred to as "EA app."

If the receiving apparatus 20 includes a communication function, the apparatus may gain access to the EA server 40 via a communication line 90 such as the Internet or a mobile phone network to request an emergency information application. The receiving apparatus 20 may then receive and execute the emergency information application distributed by the EA server 40 via the communication line 90. This application allows the receiving apparatus 20 to display on its screen more detailed information related to emergency information, for example.

The way the broadcast station (its transmitting apparatus 10) generates emergency information is not limited to what was described above. Some other suitable generating method, such as the use of CAP information in its original format, may be adopted. The CAP information as the information for generating emergency information is only an example. Emergency information may alternatively be generated using, for example, information obtained by converting the emergency information source information to a format complying with some other suitable protocol.

In a number of countries, the Moving Picture Experts Group phase 2-Transport Stream (MPEG2-TS) has been adopted as the transmission method constituting part of their digital broadcast standards. In the future, more advanced services are expected to be offered through the introduction of an Internet Protocol (IP) transmission scheme utilizing, for digital broadcasting, IP packets currently used in the field of telecommunications.

In particular, the adoption of digital broadcasting using the IP transmission scheme has been decided by the Advanced Television Systems Committee (ATSC) 3.0, the next-generation broadcast standard of the United States being worked out at the moment. For example, in the transmission system 1 of FIG. 1, the transmitting apparatus 10 can transmit data to the receiving apparatus 20 in accordance with the ATSC 3.0 via the transmission line 80.

(Method of Transmitting Emergency Information Under the IP Transmission Scheme)

Figure 2:
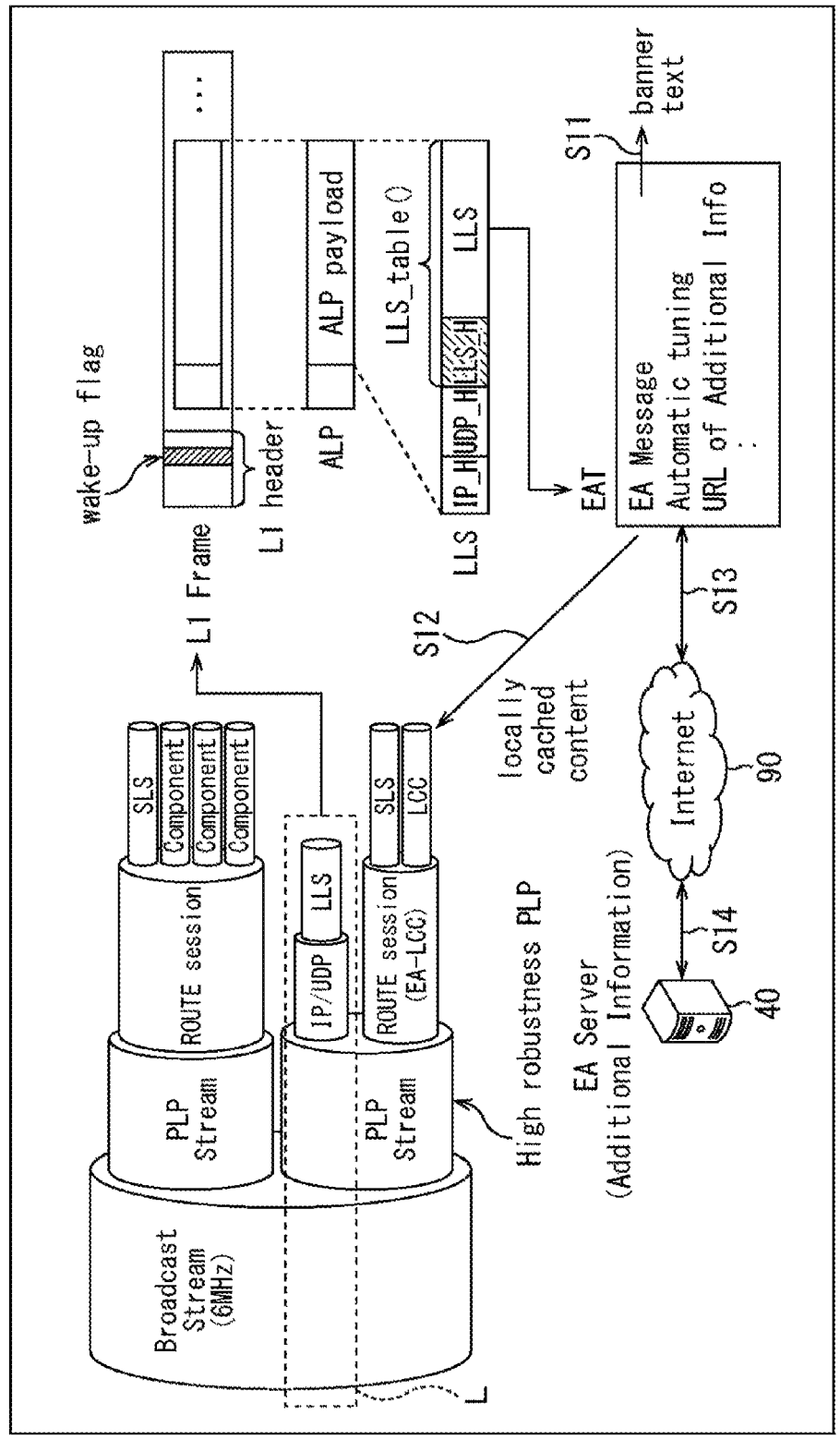
FIG. 2 is a schematic diagram outlining an emergency information transmission method applicable where digital broadcasting under an IP transmission scheme is adopted.

FIG. 2 is a schematic diagram outlining an emergency information transmission method applicable where digital broadcasting under the IP transmission scheme is adopted.

In FIG. 2, a pipe diagram depicted on the left represents a digital broadcast system pipe model according to the IP transmission scheme. In the system pipe model, the broadcast stream of a given frequency band (e.g., 6 MHz) includes one or multiple PLP streams. Each PLP stream includes signaling- and service-specific streams.

The broadcast stream of a given frequency band is identified by a broadcast stream ID. Each PLP stream is identified by a PLP ID. Each service is identified by a service ID.

Link Layer Signaling (LLS) is placed in an IP/UDP packet when transmitted. The LLS signaling is acquired prior to Service Layer Signaling (SLS). The SLS signaling is acquired in accordance with information in the LLS signaling.

The LLS signaling includes metadata such as Service List Table (SLT), Region Rating Table (RRT), and Emergency Alerting Table (EAT). The SLT metadata includes information indicating a configuration of streams and services of a broadcast network, such as information necessary for selecting services (tuning information). The RRT metadata includes information about rating. The EAT metadata includes information related to the emergency information (emergency warning information) that needs to be urgently announced.

The metadata such as SLT and EAT is described in markup language such as Extensible Markup Language (XML).

The service-specific streams are transmitted in a Real-Time Object Delivery over Unidirectional Transport (ROUTE) session. The ROUTE is a protocol extended from the File Delivery over Unidirectional Transport (FLUTE), a protocol suitable for unidirectional multicast transfer of files. Each service-specific stream transmits the SLS signaling, components, and locally cached content (LCC) in a ROUTE session.

The SLS signaling includes metadata such as User Service Description (USD), Service-based Transport Session Instance Description (S-TSID), and Media Presentation Description (MPD), for example. The USD metadata includes information such as destinations from which to acquire other metadata. The S-TSID metadata is an extension of the LCT Session Instance Description (LSID) for the ATSC 3.0, and serves as the control information for the ROUTE protocol. The MPD metadata serves as the control information for managing the reproduction of component streams.

The metadata such as USD, S-TSID, and MPD is described in markup language such as XML. The MPD metadata complies with the MPEG-Dynamic Adaptive Streaming over HTTP (DASH) standard.

The components are data constituting the content such as videos, audios, and subtitles. The LCC content is stored (downloaded) into the storage of the receiving apparatus 20 before being processed. It is to be noted that the notation LCC may be replaced with the notation NRT, which stands for Non-Real Time.

Although not depicted for purpose of simplification and illustration, the PLP stream also transmits streams of the Network Time Protocol (NTP) as time-of-day information and the Electronic Service Guide (ESG) as a service guide, for example.

In the pipe diagram of FIG. 2, the broadcast stream includes two PLP streams identified by different PLP IDs. One PLP stream (depicted above in the drawing) is an ordinary PLP stream. The other PLP stream (depicted below) is a high-robustness PLP stream.

In this example, the ordinary PLP stream transmits service components and the SLS signaling. The high-robustness PLP stream transmits streams of the LLS signaling and LCC content. Thus the LLS signaling and LCC content are transmitted reliably. Also in this example, the LLS signaling is used by multiple services on a shared basis.

If the portion enclosed by broken lines L in the drawing is considered, the EAT metadata as the LLS signaling is transmitted in an emergency as described below.

In the protocol stack of the IP transmission scheme, the lowest layer is the physical layer (L1: layer 1). The layer immediately above the physical layer is layer 2 (L2). The layer immediately above layer 2 is the IP layer. The layer immediately above the IP layer is the UDP layer.

That is, as depicted in a frame (packet) structure drawing on the right in FIG. 2, an L1 frame on the physical layer includes of an L1 header and an L1 payload. The L1 header includes a wake-up flag for activating, in an emergency, the receiving apparatus 20 that remains turned off in a standby state. The L1 payload includes multiple ATSC Link-Layer Protocol (ALP) packets.

The ALP packet is a transmission packet on layer 2. The ALP payload of the ALP packet contains an LLS table. Placed in an IP/UDP packet when transmitted, the LLS table has its LLS header (LLS_H) supplemented with an IP header (IP_H) and a UDP header (UDP_H). Also, the LLS table includes LLS signaling data, which is EAT metadata in this example.

Figure 3:
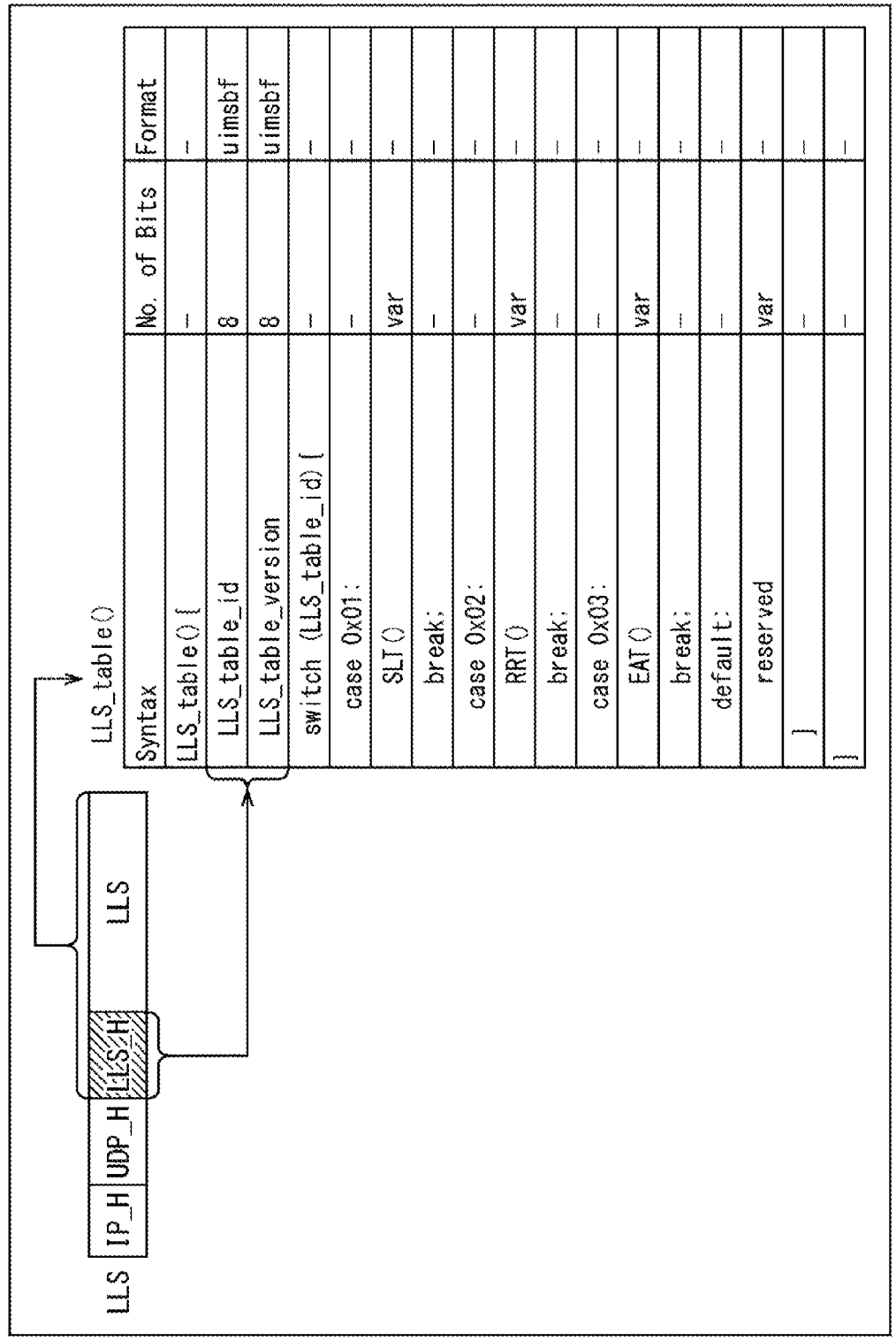
FIG. 3 is a schematic diagram depicting typical syntax of an LLS table.

FIG. 3 is a schematic diagram depicting typical syntax of the LLS table. In the LLS table of FIG. 3, an LLS table ID identifying the LLS table is designated in an eight-bit LLS_table_id field. The version of the LLS table is designated in an eight-bit LLS_table_version field. The LLS_table_id field and the LLS_table_version field are included in the LLS header.

If "0x01" is designated as the LLS table ID using a switch statement, this indicates that SLT metadata is provided as the LLS signaling data. If "0x02" is designated as the LLS table ID, this indicates that the RRT metadata is provided as the LLS signaling data. If "0x03" is designated, this indicates that the EAT metadata is provided as the LLS signaling data.

Returning to the explanation of FIG. 2, the EAT metadata included in the LLS table contains information related to emergency information. If banner text is included in the EAT metadata, the receiving apparatus 20 displays the banner text based on the EAT metadata.

It is to be noted that the EAT metadata includes an element indicating the presence or absence of burned-in text. If there is burned-in text, the element includes information indicating where the burned-in text is to be displayed (display position information). In this case, in accordance with the EAT metadata, the receiving apparatus 20 displays the banner text at a position different from the display position of the burned-in text (EA text) on the screen (S11).

If an emergency information application including detail information about emergency information (emergency detail information) is provided as LCC content, the EAT metadata includes information related to the emergency information application. In this case, in accordance with the EAT metadata, the receiving apparatus 20 may acquire and execute the emergency information application (EA APP) transmitted in the ROUTE session to display the emergency detail information (S12).

Furthermore, where emergency detail information is provided by an EA server 40, the EAT metadata includes information indicating a uniform resource locator (URL) of that EA server 40. In this case, in accordance with the EAT metadata, the receiving apparatus 20 gains access to the EA server 40 via the communication line 90 (Internet) to request the emergency detail information (S13 and S14). The receiving apparatus 20 then displays the emergency detail information distributed by the EA server 40 (S14 and S13). It is to be noted that the emergency detail information distributed by the EA server 40 may be provided as an emergency information application (EA APP).

Although it was explained above with regard to the example of FIG. 2 that the ROUTE is used as the transport protocol for the transport layer, some other transport protocol may alternatively be adopted. For example, according to the ATSC 3.0 currently worked out, the ROUTE and the MPEG Media Transport (MMT) are supposed to coexist. Besides the ROUTE session, an MMT session may be used to transmit streams of components and signaling.

As described above, where the ROUTE or the MMT is used as the transport protocol for digital broadcasting under the IP transmission scheme such as the ATSC 3.0, the emergency information that reflects emergency information source information (e.g., emergency warning issued at the time of a natural disaster) from an emergency information source (e.g., the Federal Emergency Management Agency (FEMA)) may be conveyed (communicated) to the receiving apparatus 20 in an emergency.

Emergency information falls into two categories: information to be displayed rapidly by numerous receiving apparatuses 20, and detail information about that information. The information in the first category primarily includes short text information such as "Tornado Warning" or "Earthquake Warning," and may be read out loud for the benefit of visually challenged people. The information in the second category is provided using multiple monomedia files or multimedia files such as still images and applications supporting Hyper Text Markup Language 5 (HTML5).

The information in the first category is transmitted in one of two ways: either the broadcast station (its transmitting apparatus 10) transmits burned-in text having emergency information (text information) embedded in a television program video; or the broadcast station (its transmitting apparatus 10) transmits, apart from a television program video or audio, emergency information (text information) that is overlaid on the television program video by the receiving apparatus 20. The receiving apparatus 20 may not only display either burned-in text or banner text but also display both the burned-in text and the banner text when receiving both from the transmitting apparatus 10.

In that case, the banner text is required to be displayed on the screen of the receiving apparatus 20 without interfering with the display of the burned-in text. According to the present technology, the presence or absence of burned-in text is indicated in EAT metadata. If there is burned-in text, the metadata is arranged to include display position information about the burned-in text (banner text display inhibited region information). This allows the receiving apparatus 20 to display the banner text at a position different from the display position of the burned-in text in accordance with the display position information included in the EAT metadata.

As a result, the receiving apparatus 20 can perform control to display simultaneously two categories of emergency information, i.e., burned-in text and banner text, at appropriate positions. Some program producers may presumably want to have the emergency information displayed not video-scaled but overlaid. In such a case, the intention of the program producer can be reflected in the way the emergency information is displayed. It is also possible to present viewers with the emergency information in an easy-to-view layout. Furthermore, the broadcast station is provided with additional alternative means of emergency information transmission because the broadcast station permits simultaneous display of both burned-in text and banner text that are transmitted in different ways as the emergency information. When broadcast services based on the ATSC 3.0 currently worked out are eventually started, there will be more alternatives in what kind of equipment to introduce and how to introduce it. This provides an advantage of lowering introduction costs, among others.

The information in the second category is provided as emergency detail information in the form of an emergency information application transmitted as LCC content in a ROUTE session or an emergency information application distributed by the EA server 40, for example. That means the receiving apparatus 20 can display the emergency detail information by acquiring the emergency information application, for example.

(Typical Displays of Emergency Information)

Figure 4:
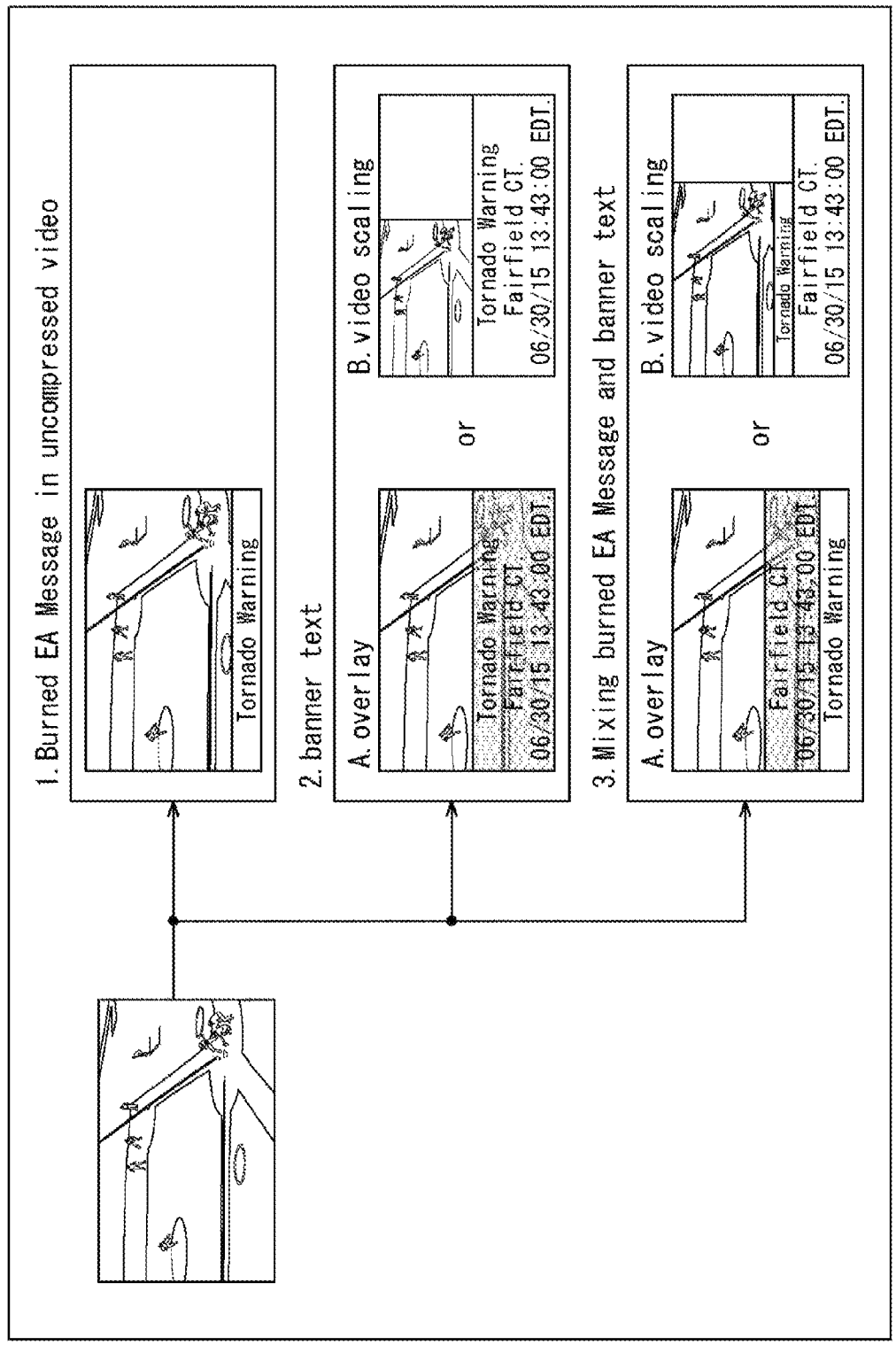
FIG. 4 is a schematic diagram depicting typical displays of emergency information.

FIG. 4 is a schematic diagram depicting typical displays of emergency information.

There are three methods of displaying emergency information on the screen. The first method involves displaying only burned-in text. The second method involves displaying only banner text. The third method involves displaying both burned-in text and banner text simultaneously.

FIG. 4 schematically depicts how emergency information communicated while a baseball broadcast program is being viewed is typically displayed by one of the first to the third methods.

By the first method (1. Burned EA Message in uncompressed video), as depicted in the upper part of the drawing, emergency information ("Tornado Warning") is embedded in a baseball broadcast video (uncompressed video data) and displayed as burned-in text.

By the second method (2. banner text), as depicted in the middle part of the drawing, the emergency information ("Tornado Warning") and the location applicable to the warning along with time-of-day information ("Fairfield Conn. 06/30/15 13:43:00 EDT.") are displayed as banner text. There are two kinds of display layout for the second method: overlay display, and video scaling display.

If the overlay display is adopted for the second method, the emergency information is displayed as banner text overlaid in a portion of the baseball broadcast video. In the ensuing description, the case where the second method is used and where banner text is displayed overlaid may be referred to as "the second method A."

On the other hand, if the video scaling display is adopted for the second method, the vertical and horizontal sizes of the baseball broadcast video are scaled down. In a resulting inverted L-shaped region, the emergency information is displayed as banner text. In the ensuing description, the case where the second method is used and where banner text is displayed video-scaled may be referred to as "the second method B."

By the third method (3. Mixing burned EA Message and banner text), as depicted in the bottom part of the drawing, the emergency information ("Tornado Warning") is embedded in the baseball broadcast video (uncompressed video data) and displayed as burned-in text. Also by the third method, another emergency information (location applicable to the warning along with time-of-day information: "Fairfield Conn. 06/30/15 13:43:00 EDT.") is displayed as banner text.

As with the display layout of the second method, there are two kinds of display layout for the second method: overlay display, and video scaling display.

If the overlay display is adopted for the third method, the emergency information (location applicable to the warning along with time-of-day information: "Fairfield Conn. 06/30/15 13:43:00 EDT.") is displayed overlaid in a portion of the baseball broadcast program. In the ensuing description, the case where the third method is used and where banner text is displayed overlaid may be referred to as "the third method A."

On the other hand, if the video scaling display is adopted for the third method, the vertical and horizontal sizes of the baseball broadcast video are scaled down. In the resulting inverted L-shaped region, the emergency information is displayed as banner text. In the ensuing description, the case where the third method is used and where banner text is displayed video-scaled may be referred to as "the third method B."

According to the present technology, when displaying both burned-in text and banner text simultaneously, the receiving apparatus 20 displays the banner text at a position different from the display position of the burned-in text in accordance with the display position information about the burned-in text (banner text display inhibited region information) included in the EAT metadata. Such a presentation is expected in the case where the third method A is adopted.

The EAT metadata may be arranged to include information indicating whether banner text is to be displayed overlaid or video-scaled (display layout information). The display layout for banner text is not limited to the overlay display or video scaling display; the banner text may be displayed in some other suitable format. The format in which the video scaling display is made by the second method B or by the third method B mentioned above is only an example and is not limited to the inverted L-shaped format. Some other suitable display format, such as an L-shaped format, may be adopted as long as it provides for a sufficient region in which to display banner text.

(Typical Displays of Banner Text)

Figure 5:
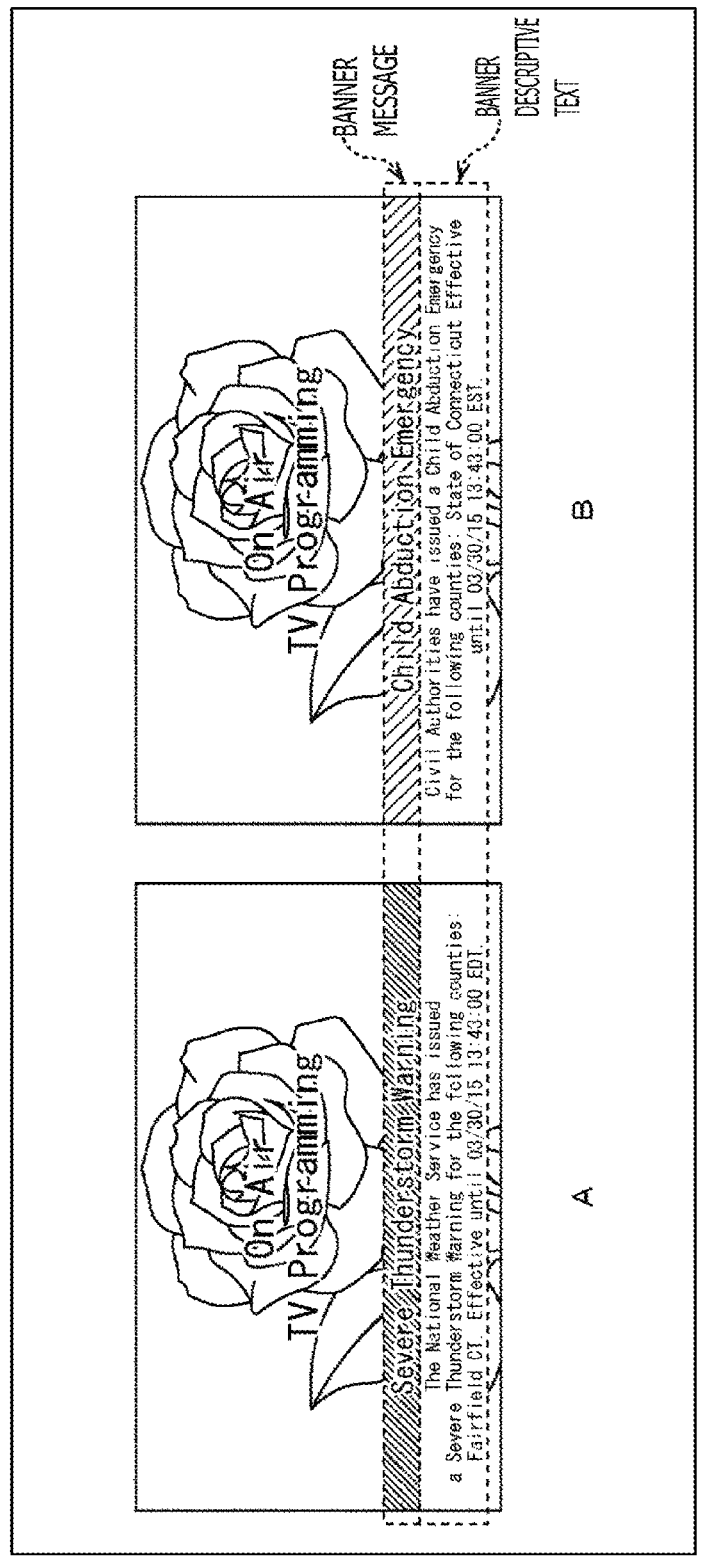
FIG. 5 is a schematic diagram depicting typical displays of banner text.

FIG. 5 is a schematic diagram depicting typical displays of banner text.

Emergency information in the form of banner text may be provided in two stages: a banner message, and banner descriptive text. The banner message is a caption of the emergency information and communicates the type of the emergency information in a short sentence, for example. The banner descriptive text is designed to communicate the emergency information in detailed sentences (detail information).

The banner message and the banner descriptive text may be displayed in different forms. For example, the banner message may be displayed highlighted whereas the banner descriptive text may be displayed in characters smaller than those of the banner message.

In Subfigure A of FIG. 5, for example, banner text is displayed overlaid on a television program. The banner text has a banner message ("Severe Thunderstorm Warning") displayed as a highlighted caption indicating that the emergency information is weather information. The details of the weather information ("The National Weather . . . ") are displayed as banner descriptive text in smaller characters than those of the caption.

Likewise, in Subfigure B of FIG. 5, for example, a banner message is displayed as a highlighted caption ("Child Abduction Emergency") indicating that the emergency information is an AMBER alert. The details of the AMBER alert ("Civil Authorities have . . . ") are displayed as banner descriptive text in smaller characters than those of the caption.

<2. Typical Syntax>

FIG. 6 is a schematic diagram depicting typical syntax of EAT metadata in the XML format. In FIG. 6, which lists elements and attributes, each attribute is prefixed with a symbol "@." It is to be noted that an indented element or attribute is designated as subordinate to its higher element.

As depicted in FIG. 6, the EAT element serving as the root element is placed above an AutomaticTuningService element, a BurnedInMessageRegion element, a MessageLayoutPolicy element, and an EaMessage element.

Designated in the AutomaticTuningService element is information about an automatic tuning service (ATS) used when the receiving apparatus 20 is forcibly activated.

The AutomaticTuningService element is placed above a broadcastStreamID attribute and a serviceId attribute. In the broadcastStreamID attribute, a broadcast stream ID of the automatic tuning service is designated. In the serviceId attribute, a service ID of the automatic tuning service is designated.

Designated in the BurnedInMessageRegion element is information indicating the position at which burned-in text, if present, is to be displayed (display position information). Because the cardinality of the BurnedInMessageRegion element is "0 . . . n," not only one or multiple BurnedInMessageRegion elements may be described, but also the BurnedInMessageRegion element itself may not be described.

If one or multiple BurnedInMessageRegion elements are described, the presence of burned-in text is indicated. Also, the display position information about the target burned-in text is designated as the value of the element. That is, if the first method or the third method is adopted, one or multiple BurnedInMessageRegion elements are described.

On the other hand, if the BurnedInMessageRegion element is not described, the absence of burned-in text is indicated. That is, if the second method is adopted, the BurnedInMessageRegion element is not described.

The BurnedInMessageRegion element is placed above a type attribute. Designated in the type attribute is information indicating the type of the display position for burned-in text. For example, "coordinates" or "upper/middle/bottom" is designated in the type attribute.

The type attribute "coordinates" indicates that the display position of burned-in text is defined in an X-Y coordinate system with its origin set at the top left corner of the screen of the receiving apparatus 20, for example. The type attribute "upper/middle/bottom" indicates vertically divided three regions, i.e., upper region, middle region, and bottom region, of the screen of the receiving apparatus 20. The type attribute further indicates that one of the three regions may be designated so that the burned-in text may be displayed in the designated region.

If multiple BurnedInMessageRegion elements are described, burned-in text is displayed in multiple regions on the screen of the receiving apparatus 20. The format of the information indicating the display positions of the burned-in text is not limited to the above-mentioned coordinate system or its alternative. Some other suitable format may be adopted as long as it allows the information to identify the display positions of burned-in text (e.g., absolute or relative positions, percentage display, etc.).

Designated in the MessageLayoutPolicy element is information about the display layout of banner text (display layout information). For example, "overlay" or "scaling" is designated in the MessageLayoutPolicy element.

The designation of "overlay" indicates that banner text is displayed overlaid. That is, if the second method A or the third method A is adopted, "overlay" is designated in the MessageLayoutPolicy element. The designation of "scaling" indicates that banner text is displayed video-scaled. That is, if the second method B or the third method B is adopted, "scaling" is designated in the MessageLayoutPolicy element.

In the EaMessage element, information about emergency information is designated. The EaMessage element is placed above an eaMessageId attribute, an eaCategory attribute, an EaGeolocation element, an EaBannerMessage element, an EaBannerDescription element, a SpeechInfo element, a SpeechInfoURI element, an EaApplication element, an EaService element, an EaAudio element, and an EaWww element.

In the eaMessageId attribute, a message ID is designated as the identifier of the emergency information. In the eaCategory attribute, a category of the emergency information is designated.

In the EaGeolocation element, information about the area targeted for the emergency information is designated. The MessageLayoutPolicy element is placed above the type attribute. In the type attribute, information about the target area for the emergency information is designated. For example, "zip" or "latitude/longitude" is designated in the type attribute.

The designation of "zip" indicates that the target area is designated by a five-digit or nine-digit postal code (ZIP code) used by the United States Postal Service (USPS), for example. The designation of "latitude/longitude" indicates that the target area is designated in latitude and longitude.

If emergency information is provided as banner text, a banner message of the banner text is designated in the EaBannerMessage element. This banner message corresponds to the banner message in FIG. 5.

The EaBannerMessage element is placed above the type attribute. Designated in the type attribute is type information indicating the banner message type of banner text. For example, "CAP," "text," "EEE code," or "TTML" is designated in the type attribute.

The designation of "CAP" indicates that CAP information as emergency information source information (emergency warning message) issued by an emergency information source (EA Authority) is provided in part or in total. The designation of "text" indicates that the banner message is text information. The designation of "EEE code" indicates that the banner message complies with the EEE code stipulated by the Federal Communications Commission (FCC). The designation of "TTML" indicates that the banner message is described in Timed Text Markup Language (TTML).

If emergency information is provided as banner text, banner descriptive text of the banner text is designated in the EaBannerDescription element. This banner descriptive text corresponds to the banner descriptive text in FIG. 5.

That is, if the second method and the third method are adopted, a banner message is described as the EaBannerMessage element. Furthermore, banner descriptive text is described as the EaBannerDescription element.

If speech audio metadata is provided, the content of the speech audio metadata itself is described in the SpeechInfo element. The speech audio metadata refers to speech audio information that enables emergency information to be spoken as intended by the producer. For example, the content of the speech audio metadata is described in Speech Synthesis Markup Language (SSML). The speech audio metadata is used to read out loud for the benefit of visually challenged people.

The SpeechInfo element is placed above a content-type attribute and a content-enc attribute. Designated in the content-type attribute is type information indicating the type of the speech audio metadata described in the SpeechInfo element. For example, "SSML" is designated in the content-type attribute. Designated in the content-enc attribute is information indicating the method for encoding the speech audio metadata described in the SpeechInfo element. For example, "zip" is designated in the content-enc attribute.

If speech audio metadata is provided, address information for acquiring the speech audio metadata (e.g., Uniform Resource Identifier (URI)) is designated in the SpeechInfoURI element. For example, if a speech audio metadata file is provided by an EA server 40 connected with the communication line 90 such as the Internet, the URL for accessing the EA server 40 is designated as the address information.

The SpeechInfoURI element is placed above the content-type attribute and the content-enc attribute. Designated in the content-type attribute is type information indicating the type of the speech audio metadata acquired by referencing the address information such as a URI. For example, "SSML" is designated in the content-type attribute. Designated in the content-enc attribute is information indicating the method for encoding the speech audio metadata acquired by referencing the address information such as a URI. For example, "zip" is designated in the content-enc attribute.

If an emergency information application that includes emergency detail information is provided, information about the emergency information application is designated in the EaApplication element. The EaApplication element is placed above an applicationId attribute. An application ID of the emergency information application is designated in the applicationId attribute. The application ID is related to the identifiers of the applications managed by the use of application control information such as Application Information Table (AIT).

If emergency detail information is provided as an emergency information service, information about the emergency information service is designated in the EaService element. The EaService element is placed above the serviceId attribute. A service ID of the emergency information service is designated in the serviceId attribute.

If emergency information (emergency detail information) is provided as audio information using a shared audio component that is shared with other services, information about the shared audio is designated in the EaAudio element. The EaAudio element is placed above an id attribute. A component ID identifying the audio component is designated in the id attribute.

If emergency detail information is provided by an EA server 40 connected with the communication line 90 such as the Internet, information about that EA server 40 is designated in the EaWww element. The EaWww element is placed above an uri attribute. Designated in the uri attribute is the URL of the EA server 40 providing the emergency detail information. The EA server 40 may provide an emergency information application as the emergency detail information.

In FIG. 6, if "1" is designated as the cardinality of an element or an attribute, always one such element or attribute is designated. If "0 . . . 1" is designated, whether or not to designate the element or attribute is optional. If "1 . . . n" is designated, one or more such elements or attributes are designated. If "0 . . . n" is designated, whether or not to designate at least one such element or attribute is optional.

If "integer" is designated as Data Type for an element or an attribute, the value of that element or attribute is indicated to be an integer. If "string" is designated as Data Type for an element or an attribute, the value of that element or attribute is indicated to be a character string. If "anyURI" is designated as Data Type for an element or an attribute, the value of that element or attribute is indicated to be any URI data.

The syntax of the EAT metadata depicted in FIG. 6 is only an example. Some other suitable syntax, with more elements or attributes added as needed, may alternatively be adopted. The EAT metadata may be described not only in XML but also in some other suitable markup language. The EAT metadata may also be of selection type.

<3. Configurations of Apparatuses>

Explained below are detailed configurations of the apparatuses constituting the transmission system 1 in FIG. 1. The explanation below will center on the configuration of the transmitting apparatus 10 set up by the broadcast station and on the configuration of the receiving apparatus 20 installed by the user.

Figure 7:
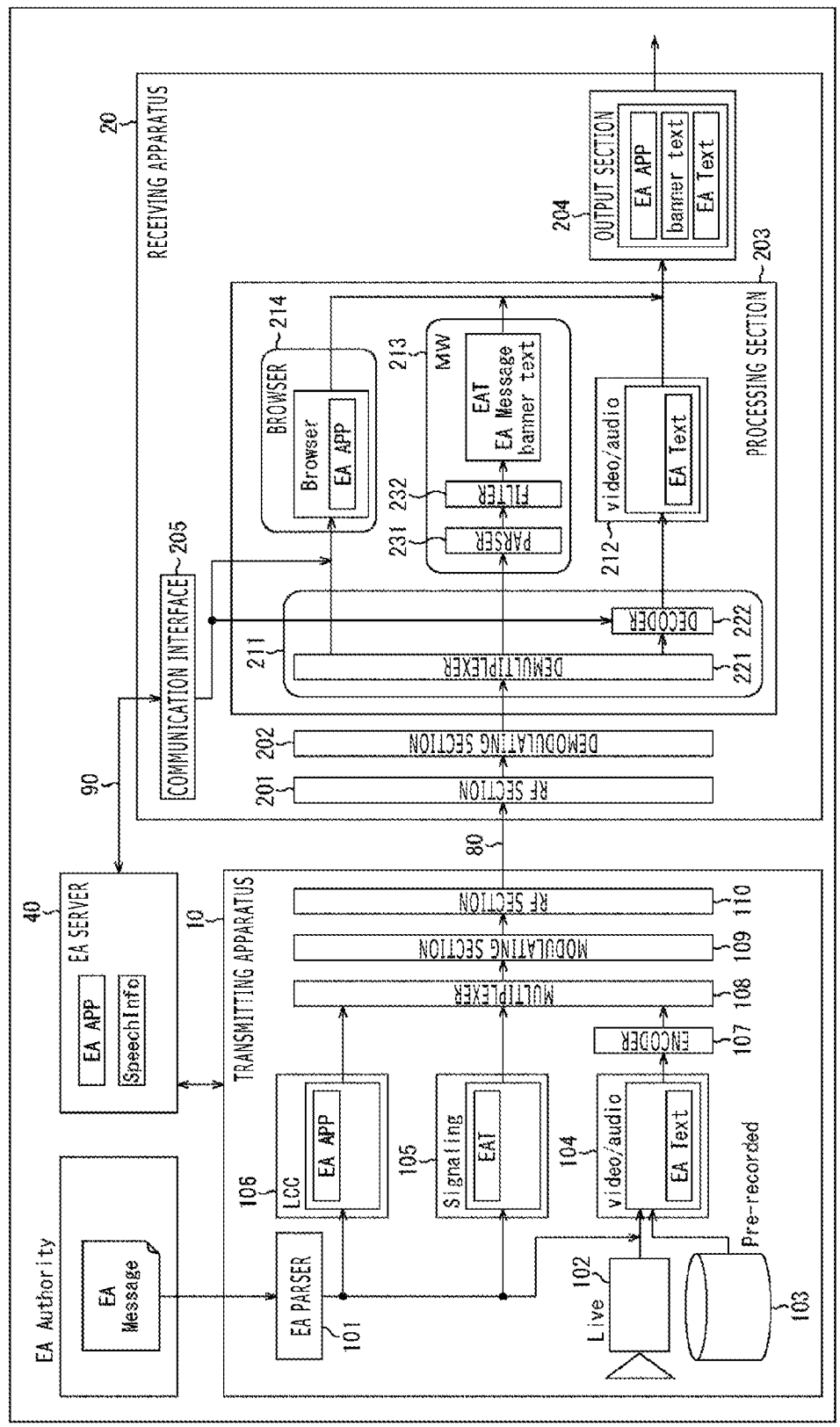
FIG. 7 is a schematic diagram depicting typical configurations of apparatuses constituting the transmission system.

FIG. 7 is a schematic diagram depicting typical configurations of apparatuses constituting the transmission system 1.

In FIG. 7, the transmitting apparatus 10 includes an EA parser 101, a live content acquiring section 102, storage 103, a component processing section 104, a signaling processing section 105, an LCC processing section 106, an encoder 107, a multiplexer 108, a modulating section 109, and an RF section 110.

In an emergency, the EA parser 101 acquires and analyzes CAP information including emergency information source information communicated from an emergency information source (EA Authority). The EA parser 101 feeds the result of analysis of the CAP information (emergency information) to the component processing section 104, the signaling processing section 105, or the LCC processing section 106.

In response to a request from the component processing section 104, the live content acquiring section 102 acquires the data of live content (e.g., live broadcast program such as a sports broadcast) transmitted from a live broadcast location via a transmission path or a communication line. The live content acquiring section 102 feeds the acquired data to the component processing section 104. The live content includes such components as videos, audios and subtitles.

The storage 103 stores recorded content (e.g., pre-recorded programs such as dramas). In response to a request from the component processing section 104, the storage 103 feeds the requested recorded content to the component processing section 104. The recorded content includes such components as videos, audios and subtitles.

The component processing section 104 acquires live content from the live content acquiring section 102 or recorded content from the storage 103. The component processing section 104 processes the components such as videos and audios constituting the acquired content, before feeding the processed components to the encoder 107.

The encoder 107 encodes the data of the components such as videos and audios supplied from the component processing section 104 in accordance with a predetermined encoding method. The encoder 107 feeds the encoded data to the multiplexer 108.

In an emergency, if the first method or the third method is adopted, burned-in text (EA text) is displayed on the screen of the receiving apparatus 20. This involves supplying the component processing section 104 with the emergency information from the EA parser 101. When supplied with emergency information from the EA parser 101, the component processing section 104 embeds that emergency information (text information) from the EA parser 101 into the video (uncompressed video data) of the content (e.g., live broadcast program or pre-recorded program). The encoder 107 then encodes the video data embedded with the emergency information (text information) in accordance with a predetermined encoding method.

The signaling processing section 105 generates signaling such as the LLS signaling or the SLS signaling and feeds the generated signaling to the multiplexer 108. For example, SLT metadata is generated as the LLS signaling. Metadata such as USD, S-TSID, or MPD is generated as the SLS signaling.

When supplied with emergency information from the EA parser 101 in an emergency, the signaling processing section 105 generates EAT metadata reflecting the emergency information and feeds the generated metadata to the multiplexer 108. It is to be noted that if the second method or the third method is adopted, banner text is displayed on the screen of the receiving apparatus 20. This involves including the banner message and banner descriptive text reflecting the emergency information from the EA parser 101 into the EAT metadata.

Where LCC content is to be provided, the LCC processing section 106 generates the LCC content and feeds the generated content to the multiplexer 108. When supplied with emergency information from the EA parser 101 in an emergency, the LCC processing section 106 generates an emergency information application based on the emergency information and feeds the generated application to the multiplexer 108.

The multiplexer 108 generates a multiplexed stream by multiplexing component streams supplied from the encoder 107 and a signaling stream from the signaling processing section 105, and feeds the generated multiplexed stream to the modulating section 109. When supplied with LCC content (emergency information application) from the LCC processing section 106, the multiplexer 108 generates a multiplexed stream by multiplexing the stream of the LCC content (emergency information application) together with the component streams and the signaling stream.

The modulating section 109 performs error correction encoding processing (e.g., BCH encoding or LDPC encoding) and modulation processing (e.g., orthogonal frequency division multiplexing (OFDM)) on the data of the multiplexed stream supplied from the multiplexer 108. The modulating section 109 feeds the signal resulting from the processing to the RF section 110.

The RF section 110 converts the signal supplied from the modulating section 109 into a radio frequency (RF) signal. The RF section 110 transmits the RF signal via an antenna (not depicted) as a digital broadcast signal complying with the IP transmission scheme.

The transmitting apparatus 10 is configured as described above. Although FIG. 7 depicts that the equipment on the transmitting side includes a single transmitting apparatus 10 for purpose of explanation, the transmitting-side equipment may be constituted by multiple apparatuses each furnished with the functions indicated as blocks in FIG. 7. The transmitting apparatus 10 may be equipped with a communication function allowing the emergency information application (EA APP) or the speech audio metadata (SpeechInfo) to be provided from the transmitting apparatus 10 to the EA server 40.

In FIG. 7, the receiving apparatus 20 includes an RF section 201, a demodulating section 202, a processing section 203, an output section 204, and a communication interface (I/F) 205.

The RF section 201 receives a digital broadcast signal complying with the IP transmission scheme via an antenna (not depicted), converts the RF signal in frequency to an intermediate frequency (IF) signal, and feeds the IF signal to the demodulating section 202. The RF section 201 is configured as an RF integrated circuit (IC).

The demodulating section 202 performs demodulation processing (e.g., OFDM demodulation) on the signal supplied from the RF section 201. The demodulating section 202 further performs error correction decoding processing (e.g., LDPC decoding or BCH decoding) on the signal obtained from the demodulation processing, and feeds the resulting signal to the processing section 203. The demodulating section 202 is configured as a demodulation large-scale integration (LSI) circuit.

The processing section 203 processes (e.g., performs a decoding process on) the signal supplied from the demodulating section 202. The processing section 203 feeds video and audio data obtained from the processing to the output section 204.

The processing section 203 is configured as a main system-on-chip (SoC), for example. That is, the demodulating section 202 as the demodulation LSI and the processing section 203 as the main SoC are configured as different chips that are interconnected via a predetermined interface.

The processing section 203 includes a firmware/hardware (FW/HW) section 211, a component processing section 212, a middleware (MW) section 213, and a browser 214.

The FW/HW section 211 constituted by firmware (FW) or hardware (HW) processes the signal coming from the demodulating section 202. The FW/HW section 211 is configured to include a demultiplexer 221 and a decoder 222.

The demultiplexer 221 receives input of a multiplexed stream as the signal supplied from the demodulating section 202. The demultiplexer 221 demultiplexes the multiplexed stream into streams of components such as video and audio and the signaling stream. The demultiplexed streams are fed to the decoder 222 and the MW section 213. If the stream of LCC content (emergency information application) is included in the multiplexed stream, the demultiplexer 221 demultiplexes the LCC content stream (the included application) and feeds it to the browser 214.

The decoder 222 decodes video and audio component data on the basis of the component streams supplied from the demultiplexer 221. The decoder 222 feeds the decoded data to the component processing section 212.

The component processing section 212 processes the video and audio data supplied from the decoder 222. The component processing section 212 feeds the processed data to the output section 204.

In an emergency, if the first method or the third method is adopted, emergency information (text information) is embedded in the video (uncompressed video data) of the content (e.g., live broadcast program or pre-recorded program). The emergency information thus embedded is displayed as burned-in text (EA text).

The MW section 213 including middleware (MW) processes the signaling stream supplied from the demultiplexer 221. The MW section 213 includes a parser 231 and a filter 232. The parser 231 performs the process of analyzing the target signaling. The filter 232 performs the process of extracting the target signaling. The processing section 203 processes the components and application in accordance with the signaling processed by the MW section 213.

It is to be noted that in an emergency, EAT metadata is communicated from the transmitting apparatus 10 and that the MW section 213 acquires and processes the EAT metadata. If the second method or the third method is adopted, the EAT metadata includes a banner message and banner descriptive text, which are displayed as banner text.

The browser 214 supports HTML5, for example, and executes an emergency information application supplied from the demultiplexer 221. The emergency information application (EA APP) causes emergency detail information to be displayed, for example.

The output section 204 processes the video data supplied from the component processing section 212, and outputs the processed data to a display section (not depicted). Also, the output section 204 processes the audio data supplied from the component processing section 212, and outputs the processed data to speakers (not depicted). As a result, the display section displays the video of the content such as a live broadcast program or a pre-recorded program, and the speakers output the audio in synchronism with the video.

In an emergency, if the first method or the third method is adopted, the display section displays the video of the content such as a live broadcast program embedded with burned-in text (EA text) reflecting the emergency information. If the second method or the third method is adopted in an emergency, the display section displays the video of the content such as a live broadcast program overlaid with banner text that includes a banner message and banner descriptive text. If an emergency information application (EA APP) is executed by the browser 214, the display section displays the emergency detail information involved.

The communication interface 205 exchanges various data with the EA server 40 via the communication line 90 such as the Internet.

For example, depending on the result of analysis of the EAT metadata, the communication interface 205 may request and receive an emergency information application (EA APP) from the EA server 40 via the communication line 90. The communication interface 205 feeds the received emergency information application to the browser 214 in the processing section 203. In turn, the browser 214 executes the emergency information application (EA APP) distributed by the EA server 40.

Also, depending on the result of analysis of the EAT metadata, for example, the communication interface 205 may request and receive speech audio metadata (SpeechInfo) from the EA server 40 via the communication line 90, before forwarding the speech audio metadata to the decoder 222 of the FW/HW section 211 in the processing section 203. This allows the decoder 222 (its TTS engine) to read out loud the emergency information (text information) based on the speech audio metadata (SpeechInfo). The TTS engine refers to a text-to-speech synthesizer that generates human voice artificially from text information.

The receiving apparatus 20 is configured as described above. The receiving apparatus 20 may be a stationary receiver such as a television receiver, a set-top box (STB), or a recorder; or a mobile receiver such as a mobile phone, a smartphone, or a tablet terminal. The receiving apparatus 20 may also be an onboard apparatus mounted on a vehicle. Although the receiving apparatus 20 in FIG. 7 is depicted configured in such a manner that the display section and the speakers are set up externally, the display section and the speakers may alternatively be installed inside the receiving apparatus 20.

<4. Flows of Processes Performed by the Apparatuses>

The flows of processes performed by the apparatuses constituting the transmission system 1 in FIG. 1 are explained below with reference to the flowcharts of FIGS. 8 to 13.

(Flow of the Transmitting Process)

Figure 8:
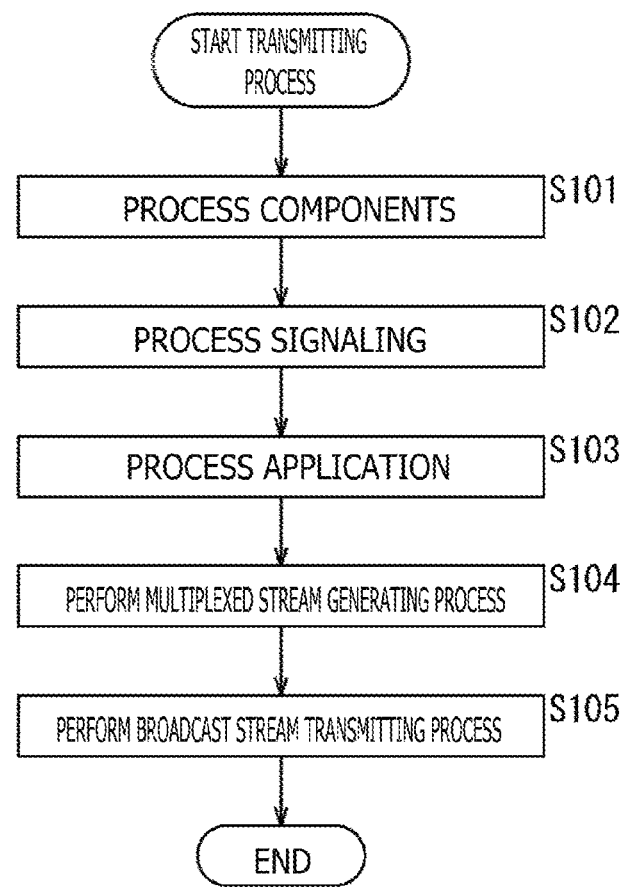
FIG. 8 is a flowchart explaining the flow of a transmitting process.

Explained first with reference to the flowchart of FIG. 8 is the transmitting process performed by the transmitting apparatus 10 in FIG. 7.

In step S101, the component processing section 104 and the encoder 107 process components.

The component processing involves acquiring live content (e.g., live broadcast program) obtained by the live content acquiring section 102 or recorded content (e.g., pre-recorded program) stored in the storage 103, and carrying out encoding or like processing on the video and audio components making up the acquired content in accordance with a predetermined encoding method.

In an emergency, if the first method or the third method is adopted, burned-in text is displayed on the screen of the receiving apparatus 20. This involves the component processing embedding emergency information (text information) from the EA parser 101 into the video (uncompressed video data) of the content (e.g., live broadcast program or pre-recorded program) before the encoding. If the second method is adopted, only banner text is displayed, so that there is no need to embed the emergency information into the content video.

In step S102, the signaling processing section 105 processes signaling.

The signaling processing involves generating and processing the signaling such as the LLS signaling or SLS signaling.

In an emergency, the signaling processing generates EAT metadata reflecting the emergency information coming from the EA parser 101 as the LLS signaling.

If the first method is adopted in this case, only burned-in text is displayed, with no need to describe banner text-related information in the EAT metadata. If the second method is adopted, only banner text is displayed, with no need to describe burned-in text-related information (e.g., display position information about the burned-in text) in the EAT metadata. If the third method is adopted, the display position information about burned-in text and the display layout information about banner text are described in the EAT metadata.

In step S103, the LCC processing section 106 processes an application.

The application processing is performed in an emergency where an emergency information application is to be transmitted. The application processing involves generating an emergency information application reflecting the emergency information coming from the EA parser 101.

In step S104, the multiplexer 108 performs the process of generating a multiplexed stream.

The multiplexed stream generating process involves generating a multiplexed stream by multiplexing the component streams obtained in step S101 and the signaling stream acquired in step S102. It is to be noted that in an emergency, EAT metadata is included in the signaling. Where an emergency information application is generated, the stream of that application is also multiplexed.

In step S105, the modulating section 109 and the RF section 110 perform the process of transmitting a broadcast stream.

The broadcast stream transmitting process involves transmitting the multiplexed stream generated in step S104 as a digital broadcast signal complying with the IP transmission scheme.

When the processing in step S105 is terminated, the transmitting process of FIG. 8 is brought to an end.

The foregoing paragraphs have explained the flow of the transmitting process.

(Flow of the Receiving Process with Power Turned Off in Standby State)

Figure 9:
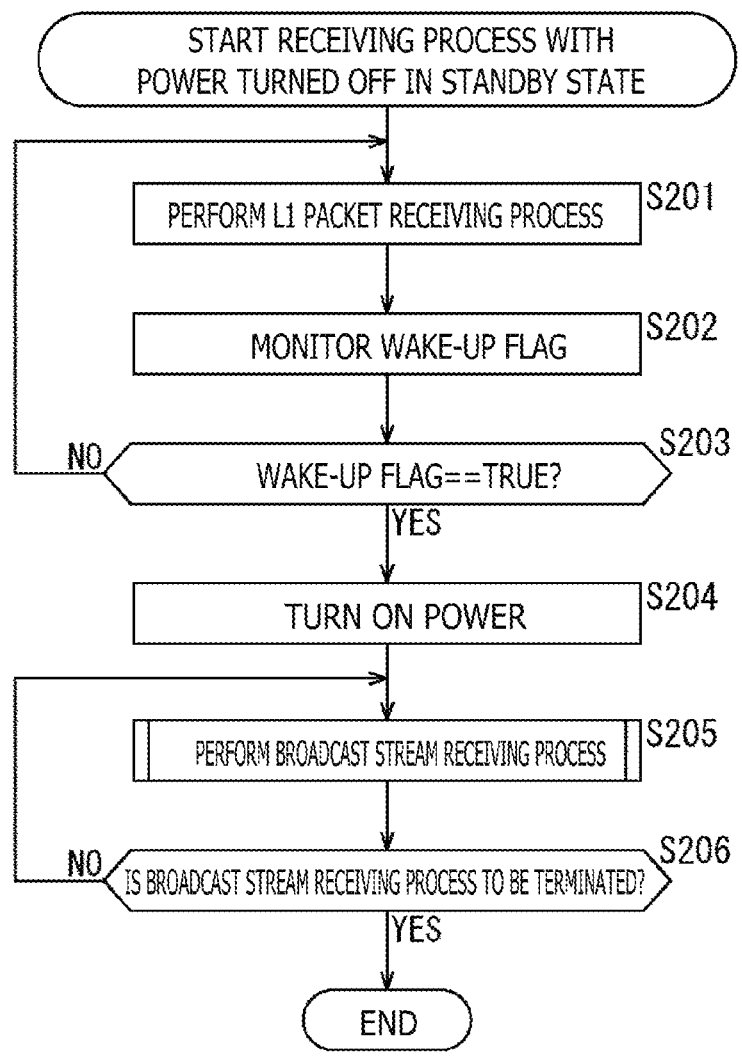
FIG. 9 is a flowchart explaining the flow of a receiving process with power turned off in a standby state.

Explained below with reference to the flowchart of FIG. 9 is the flow of the receiving process performed by the receiving apparatus 20 in FIG. 7 with its power supply turned off in a standby state. The process in the flowchart of FIG. 9 is carried out on the assumption that the receiving apparatus 20 is turned off and remains in a standby state, i.e., that the RF section 201 and the demodulating section 202 alone remain operable in the receiving apparatus 20.

In step S201, the RF section 201 and the demodulating section 202 perform the process of receiving an L1 packet.

The L1 packet receiving process involves receiving a digital broadcast signal from the transmitting apparatus 10 to acquire an L1 frame transmitted as the digital broadcast signal.

In step S202, the demodulating section 202 monitors a wake-up flag included in an L1 header of the L1 frame acquired in step S201.

In step S203, it is determined whether the wake-up flag is "TRUE" on the basis of the result of monitoring in step S202. If it is determined in step S203 that the wake-up flag is "FALSE," control is returned to step S201, and steps S201 to S203 are repeated.

If it is determined in step S203 that the wake-up flag is "TRUE," control is transferred to step S204. In step S204, the power supply of the receiving apparatus 20 is turned on.

This makes the other blocks such as the processing section 203, the output section 204 and the like, besides the RF section 201 and demodulating section 202 operable in the receiving apparatus 20.

When all functions of the receiving apparatus 20 are made operable in step S204, control is transferred to step S205. In step S205, the process of receiving a broadcast stream is carried out.

The broadcast stream receiving process involves processing the video and audio components in accordance with signaling so as to reproduce the video and audio of the content. In an emergency, emergency information such as burned-in text or banner text is displayed. The details of the broadcast stream receiving process will be discussed later with reference to the flowchart of FIG. 11.

In step S206, it is determined whether the broadcast stream receiving process of step S205 is to be terminated. If it is determined in step S206 that the broadcast stream receiving process is to be continued, control is returned to step S205, and steps S205 and S206 are repeated. On the other hand, if it is determined in step S206 that the broadcast stream receiving process is to be terminated, the receiving process with power turned off in the standby state is brought to an end in FIG. 9.

The foregoing paragraphs have explained the flow of the receiving process with power turned off in the standby state.

(Flow of the Receiving Process with Power Turned Off)

Figure 10:
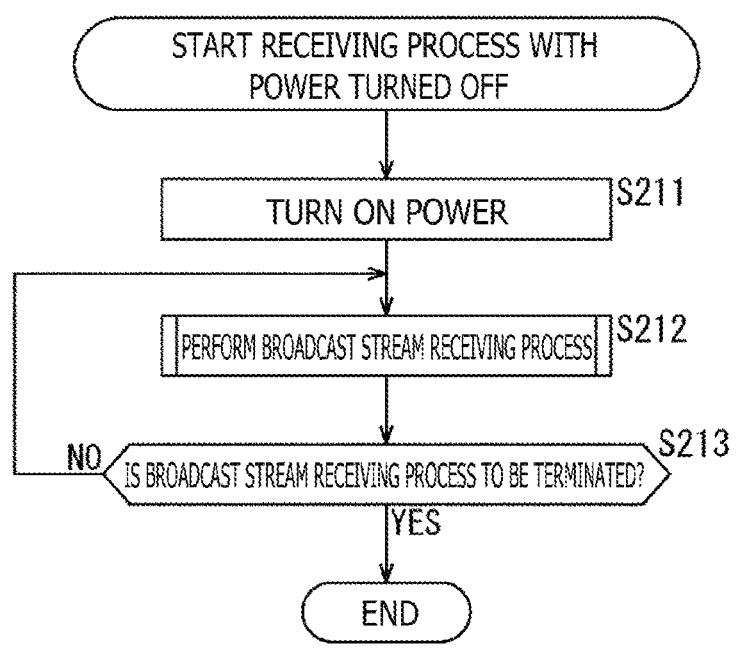
FIG. 10 is a flowchart explaining the flow of a receiving process with power turned off.

Explained below with reference to the flowchart of FIG. 10 is the flow of the receiving process performed by the receiving apparatus 20 in FIG. 7 with its power supply turned off. The process of the flowchart in FIG. 10 is carried out on the assumption that the receiving apparatus 20 is turned off, i.e., that all functions of the receiving apparatus 20 are not operable.

In step S211, the power supply of the receiving apparatus 20 is turned on in response to the user's operation, for example.

When all functions of the receiving apparatus 20 are made operable in step S211, control is transferred to step S212. In step S212, the process of receiving a broadcast stream is carried out.

The broadcast stream receiving process involves processing the video and audio components in accordance with signaling to reproduce the video and audio of the content. In an emergency, emergency information such as burned-in text or banner text is displayed. The details of the broadcast stream receiving process will be discussed later with reference to the flowchart of FIG. 11.

In step S213, it is determined whether the broadcast stream receiving process of step S212 is to be terminated. If it is determined in step S213 that the broadcast stream receiving process is to be continued, control is returned to step S212, and steps S212 and S213 are repeated. On the other hand, if it is determined in step S213 that the broadcast stream receiving process is to be terminated, the receiving process in FIG. 10 with power turned off is brought to an end.

The foregoing paragraphs have explained the flow of the receiving process with power turned off.

(Flow of the Broadcast Stream Receiving Process)

Figure 11:
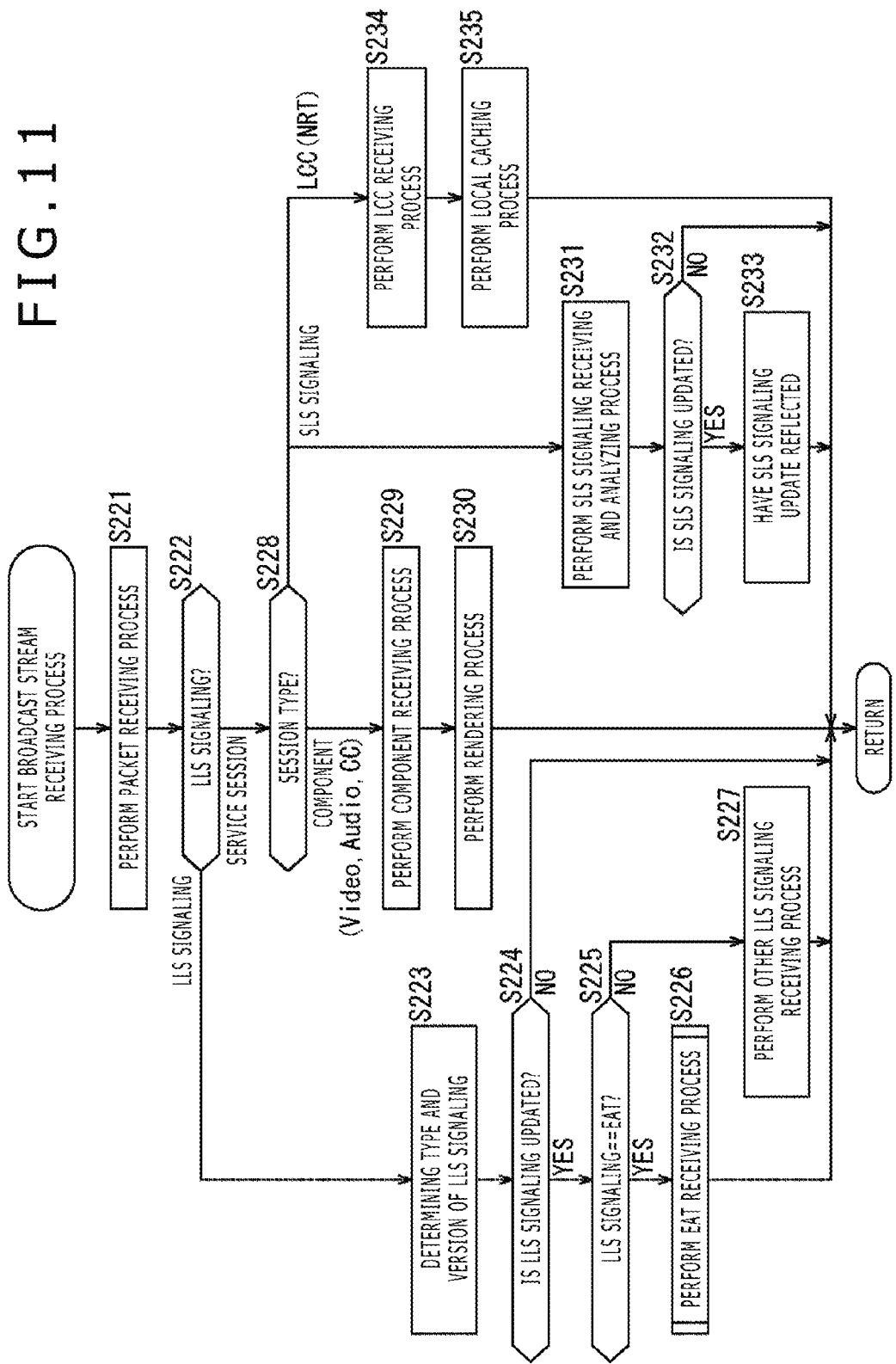
FIG. 11 is a flowchart explaining the flow of a broadcast stream receiving process.

Explained below with reference to the flowchart of FIG. 11 is the flow of the broadcast stream receiving process corresponding to the processing in step S205 of FIG. 9 or in step S212 of FIG. 10.

In step S221, the demultiplexer 221 performs a packet receiving process. The packet receiving process involves processing ALP packets and IP/UDP packets from the L1 frame processed by the demodulating section 202.

In step S222, it is determined whether LLS signaling (LLS table) is acquired on the basis of the packets obtained in step S221. If it is determined in step S222 that the LLS signaling is acquired, control is transferred to step S223.

In step S223, the MW section 213 determines the type and the version of the LLS signaling. At this point, the type and the version of the LLS signaling are determined by analyzing the LLS table ID and the LLS table version included in the LLS table (in its LL header), as explained above with reference to FIG. 3.

In step S224, the MW section 213 determines whether the LLS signaling is updated on the basis of the result of the determination in step S223. If it is determined in step S224 that the LLS signaling is updated, control is transferred to step S225.

In step S225, the MW section 213 determines whether the LLS signaling is EAT metadata on the basis of the result of the determination in step S223. If it is determined in step S225 that the LLS signaling is EAT metadata, control is transferred to step S226.

In step S226, an EAT receiving process is carried out. The EAT receiving process involves processing the emergency information reflecting the EAT metadata. The details of the EAT receiving process will be discussed later with reference to the flowchart of FIG. 12.

On the other hand, if it is determined in step S225 that the LLS signaling is not EAT metadata, control is transferred to step S227. In step S227, another LLS signaling receiving process is carried out. This LLS signaling receiving process involves processing LLS signaling such as SLT metadata other than the EAT metadata.

If it is determined in step S224 that the LLS signaling is not updated, there is no need to process the LLS signaling, so that steps S225 to S227 are skipped. When the processing in step S226 or S227 is terminated, the broadcast stream receiving process in FIG. 11 is brought to an end. Control is then returned to step S205 in FIG. 9 or to step S212 in FIG. 10, and the subsequent steps are repeated.

If it is determined in step S222 that the LLS signaling is not acquired, control is transferred to step S228. In step S228, the type of the target ROUTE session is determined. In the case of the ATSC 3.0, as described above, components and signaling may be transmitted in an MMT session. For purpose of simplification and illustration, the explanation here is based on the assumption that only the ROUTE session is used.

If it is determined in step S228 that the type of the ROUTE session points to components such as video and audio, control is transferred to step S229. In step S229 and S230, the components transmitted in the ROUTE session are processed.

Specifically, in step S229, the decoder 222 and the component processing section 212 perform a component receiving process. The component receiving process typically involves decoding the components such as video and audio constituting the content such as a television program in accordance with a predetermined decoding method.

In step S230, the output section 204 performs a rendering process. The rendering process involves reproducing and outputting the video and audio constituting the content such as a television program based on the result of the processing in step S229.

If it is determined in step S228 that the type of the ROUTE session is SLS signaling, control is transferred to step S231. In steps S231 to S233, the SLS signaling transmitted in the ROUTE session is processed.

Specifically, in step S231, the MW section 213 performs an SLS signaling receiving and analyzing process. The SLS signaling receiving and analyzing process involves acquiring and analyzing the SLS signaling such as USD metadata or S-TSID metadata transmitted in the ROUTE session.

In step S232, it is determined whether the SLS signaling is updated on the basis of the analysis in step S231. If it is determined in step S232 that the SLS signaling is updated, control is transferred to step S233.

In step S233, the updated content of the SLS signaling is reflected on the basis of the result of analysis in step S231. If it is determined in step S232 that the SLS signaling is not updated, step S233 is skipped.

If it is determined in step S228 that the type of the ROUTE session is LCC content, control is transferred to step S234. In steps S234 and S235, the LCC content transmitted in the ROUTE session is processed.

Specifically, in step S234, an LCC content receiving process is carried out. For example, the LCC content such as an application is acquired. In step S235, a local caching process is performed. The LCC content acquired in step S234 is stored (downloaded) into the storage (not depicted).

When the processing in step S230, S233, or S235 is terminated, the broadcast stream receiving process in FIG. 11 is brought to an end. Control is then returned to step S205 in FIG. 9 or to step S212 in FIG. 10, and the subsequent steps are repeated.

The foregoing paragraphs have explained the flow of the broadcast stream receiving process.

(Flow of the EAT Receiving Process)

Figure 12:
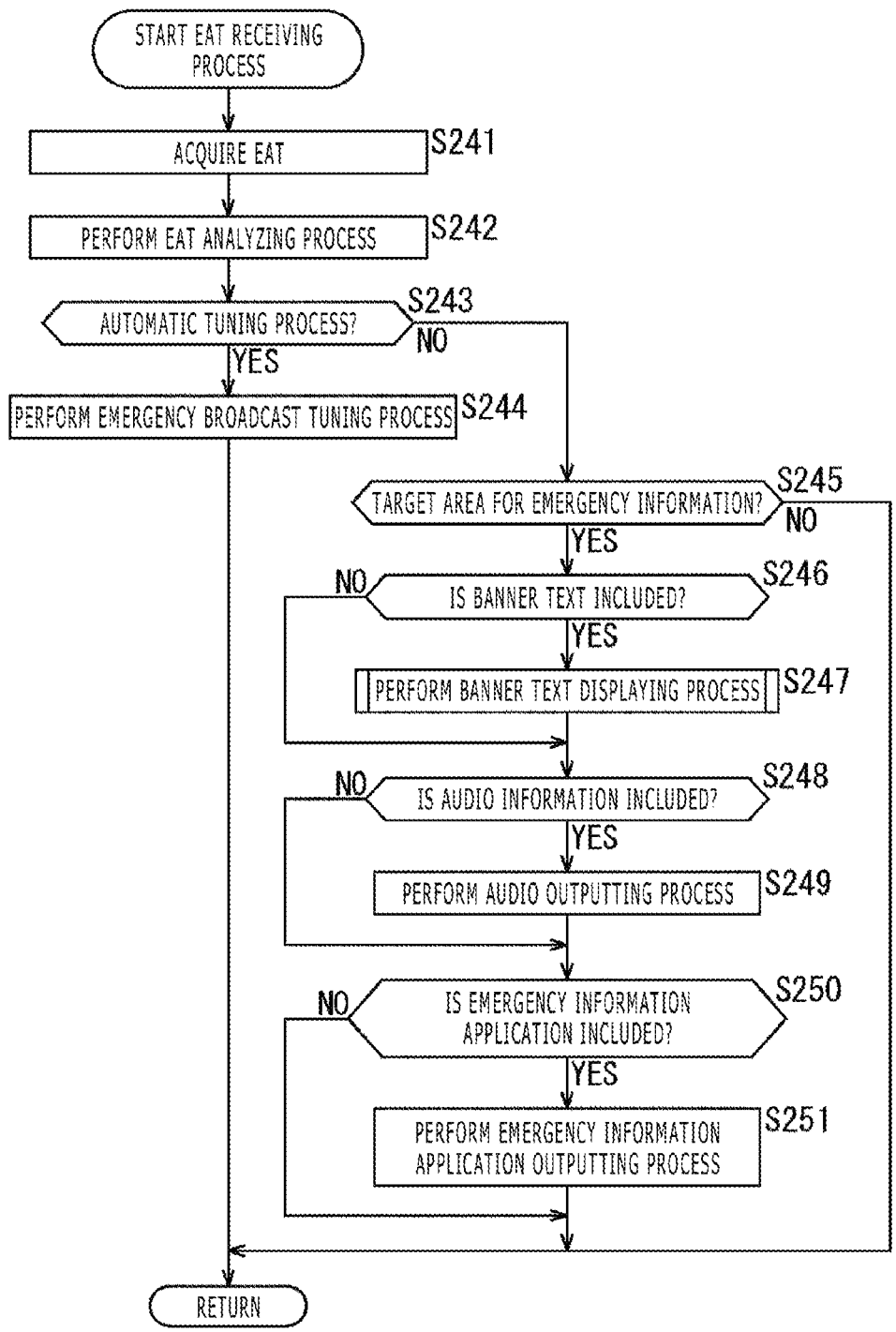
FIG. 12 is a flowchart explaining the flow of an EAT receiving process.

Explained below with reference to the flowchart of FIG. 12 is the flow of an EAT receiving process corresponding to the processing in step S226 of FIG. 11.

In step S241, the MW section 213 acquires EAT metadata.

In step S242, the MW section 213 performs the process of analyzing the EAT metadata acquired in step S241.

In step S243, the MW section 213 determines whether to perform an automatic tuning process on the basis of the analysis in step S242. At this point, it is determined whether to execute the automatic tuning process based on information about the automatic tuning service designated by the AutomaticTuningService element described in the EAT metadata in the XML format.

If it is determined in step S243 that the automatic tuning process is to be performed, control is transferred to step S244. In step S244, an emergency broadcast tuning process is carried out. The emergency broadcast tuning process is performed here on the basis of a broadcast stream ID and a service ID of the automatic tuning service designated by the broadcastStreamID attribute and by the serviceId attribute under the AutomaticTuningService element described in the EAT metadata.

When the processing in step S244 is terminated, the EAT receiving process of FIG. 12 is brought to an end. Control is then returned to step S226 of FIG. 11, and the subsequent steps are repeated.

On the other hand, if it is determined in step S243 that the automatic tuning process is not to be performed, control is transferred to step S245.

In step S245, the MW section 213 determines whether the own geolocation applies to the target area for the emergency information on the basis of the result of analysis in step S242. At this point, it is determined whether the own geolocation is applicable to the target area for the emergency information on the basis of information about the target area for the emergency information designated by the EaGeolocation element described in the EAT metadata.

If it is determined in step S245 that the own geolocation applies to the target area for the emergency information, control is transferred to step S246. In step S246, the MW section 213 determines whether banner text is included on the basis of the result of analysis in step S242. Performed at this point is the process of determining whether banner text is included in the EAT metadata on the basis of banner text-related information designated by the EaBannerMessage element and by the EaBannerDescription element under the EaMessage element described in the EAT metadata.

If it is determined in step S246 that banner text is included, control is transferred to step S247. In step S247, the MW section 213 and the output section 204, for example, carry out a banner text displaying process. The banner text displaying process involves displaying the banner text in accordance with the display position of burned-in text based on the EAT data. The details of the banner text displaying process will be discussed later with reference to the flowchart of FIG. 13.

When the processing in step S247 is terminated, control is transferred to step S248. If it is determined in step S246 that banner text is not included, step S247 is skipped and control is transferred to step S248.

In step S248, the MW section 213 determines whether audio information is included in the EAT metadata on the basis of the result of analysis in step S242. This processing involves determining whether audio information is included in accordance with the information about the speech audio metadata designated by the SpeechInfo element or by the SpeechInfoURI element described in the EAT metadata.

If it is determined in step S248 that audio information is included, control is transferred to step S249. In step S249, the MW section 213 and the output section 204, for example, perform an audio outputting process. The audio outputting process involves reading out loud the emergency information (text information) based on the speech audio metadata.

When the processing in step S249 is terminated, control is transferred to step S250. If it is determined in step S248 that audio information is not included, step S249 is skipped and control is transferred to step S250.

In step S250, the MW section 213 determines whether an emergency information application is included in the EAT metadata on the basis of the result of analysis in step S242. This processing involves determining whether an emergency information application is included in accordance with the information about an emergency information application designated by the EaApplication element described in the EAT metadata.

If it is determined in step S250 that an emergency information application is included, control is transferred to step S251. In step S251, the browser 214 and the output section 204, for example, perform an emergency information application outputting process. The emergency information application outputting process involves acquiring and executing the emergency information application (LCC content) transmitted in the ROUTE session based on the information designated by the EaApplication element described in the EAT metadata.

When the processing in step S251 is terminated, the EAT receiving process of FIG. 12 is brought to an end. If it is determined in step S250 that no emergency information application is included, step S251 is skipped and the EAT receiving process in FIG. 12 is terminated. Furthermore, if it is determined in step S245 that the own geolocation does not apply to the target area for the emergency information, steps S246 to S251 are skipped and the EAT receiving process in FIG. 12 is brought to an end. With the EAT receiving process in FIG. 12 terminated, control is returned to step S226 in FIG. 11 and the subsequent steps are repeated.

The foregoing paragraphs have explained the flow of the EAT receiving process.

(Flow of the Banner Text Displaying Process)

Explained last with reference to the flowchart of FIG. 13 is the flow of the banner text displaying process corresponding to step S247 in FIG. 12.

In step S261, the MW section 213 determines whether there is burned-in text on the basis of the result of analysis in step S242 (FIG. 12). This processing involves determining whether there is burned-in text depending on the presence or absence of the description of the BurnedInMessageRegion element in the EAT metadata.

If it is determined in step S261 that there is burned-in text, i.e., that there is at least one BurnedInMessageRegion element described in the EAT metadata, control is transferred to step S262.

In step S262, the MW section 213 determines whether video scaling is performed on the basis of the result of analysis in step S242 (FIG. 12). This processing involves determining whether video scaling is carried out on the basis of whether banner text, for example, is displayed video-scaled based on the banner text display layout information designated by the MessageLayoutPolicy element described in the EAT metadata.

If it is determined in step S262 that video scaling is performed, i.e., that video scaling display is designated as the display layout information about banner text by the MessageLayoutPolicy element in the EAT metadata, then control is transferred to step S263.

In step S263, the component processing section 212 performs a video scaling process to scale down the vertical and horizontal sizes of the content such as a television program. For example, if the third method B is adopted, banner text is displayed video-scaled, so that the video scaling process is carried out. When the processing in step S263 is terminated, control is transferred to step S265.

On the other hand, if it is determined in step S262 that video scaling is not performed, i.e., that overlay display is designated as the display layout information about banner text by the MessageLayoutPolicy element in the EAT metadata, control is transferred to step S264.

In step S264, the MW section 213 acquires the display position information about burned-in text based on the result of analysis in step S242 (FIG. 12). At this point, the display position information can be acquired because the display position information about the target burned-in text is designated as the value of the BurnedInMessageRegion element described in the EAT metadata. For example, if the third method A is adopted, the display position information about burned-in text is acquired.

When the processing in step S264 is terminated, control is transferred to step S265. If it is determined in step S261 that there is no burned-in text, i.e., that the BurnedInMessageRegion element is not described in the EAT metadata, steps S262 to S264 are skipped and control is transferred to step S265.

In step S265, the MW section 213 determines the display position of banner text based on the result of the processing in step S261 to S264.

Specifically, if there is no burned-in text ("NO" in S261), this case applies to the second method (second method A or second method B). The banner text does not interfere with burned-in text. The absence of interference allows the display position of banner text to be designated as any region, such as the bottom region of the screen.

If there is burned-in text ("YES" in S261) and if video scaling is performed ("YES" in S262), this case applies to the third method B. The display position of banner text may be designated as anywhere inside the region generated by the processing in step S263 (video scaling process). In this case, the banner text is displayed in the region generated by the video scaling process, so that the banner text does not interfere with burned-in text.

Furthermore, if there is burned-in text ("YES" in S261) and if video scaling is not performed ("NO" in S262), this case applies to the third method A, with banner text displayed overlaid on the video of a television program. That means having the banner text displayed in any region can interfere with burned-in text. In this case, the processing in step S264 is carried out and the display position information about burned-in text is thereby acquired from the EAT metadata. Thus the banner text is not displayed in the region indicated by the acquired display position information (banner text display is inhibited).

Specifically, if the coordinates of the display region for burned-in text are designated to be the display position information about burned-in text, for example, the display position of banner text is determined to be outside the display region designated by the coordinates. In another example, if the bottom region of the screen is designated to be the display position information about burned-in text, the display position of banner text is determined to be the upper or middle region of the screen.

If the display position of banner text is determined by the processing in step S265, control is transferred to step S266. In step S266, the output section 204 outputs the banner text based on the result of the determination in step S265. For example, if the third method A is adopted, both burned-in text and banner text are displayed simultaneously. However, because the banner text is displayed at a position different from the display position of the burned-in text, the banner text does not interfere with the burned-in text.

When the processing in step S266 is terminated, the banner text displaying process of FIG. 13 is brought to and end. Control is then returned to step S247 in FIG. 12 and the subsequent steps are repeated.

The foregoing paragraphs have explained the flow of the banner text displaying process.

<5. Variations>

Although the present technology was described above as applicable to the ATSC (ATSC 3.0 in particular) adopted in the United States and elsewhere as the digital broadcast standards, this technology also applies to the Integrated Services Digital Broadcasting (ISDB) adopted by Japan and others as well as to the Digital Video Broadcasting (DVB) adopted by European countries. In the transmission system 1, the transmission path 80 is not limited to terrestrial broadcasting. The transmission path 80 may alternatively be satellite broadcasting that uses broadcasting satellites (BS) or communications satellites (CS), or community antenna television (CATV) that uses cables. Whereas the present technology was described above as applicable to the Emergency Alerting System (EAS) of the United States, this technology also applies to similar systems set up by other countries.

The above-mentioned names of the signaling information such as the LLS and SLS are examples and may be replaced with other names. It is to be noted, however, that these names differ only in form and that given signaling information does not differ from other signaling information in substance. Also, where the signaling information is described in markup language such as XML, the names of the elements and attributes involved are only examples and may be replaced with other names. It is to be noted that these names differ only in form and that the differently named elements and attributes are not different in substance. Furthermore, the Locally Cached Content (LCC) may sometimes be referred to as Non-Real Time (NRT) but they are not different from each other in substance.

Although the present technology was explained above in connection with the display positions of burned-in text and banner text, this technology also applies to images, videos, and other information other than the text information. Whereas it was explained above that the emergency information is embedded in video data, the emergency information may alternatively be embedded in audio data.

<6. Configuration of a Computer>

The series of steps and processes described above may be executed either by hardware or by software. Where a software-based series of processing is to be carried out, the programs constituting the software are installed into a suitable computer. FIG. 14 is a schematic diagram depicting a typical configuration of a computer that executes the above-described series of processing using programs.

In a computer 900, a central processing unit (CPU) 901, a read-only memory (ROM) 902, and a random access memory (RAM) 903 are interconnected via a bus 904. The bus 904 is further connected with an input/output interface 905. The input/output interface 905 is connected with an input section 906, an output section 907, a recording section 908, a communication section 909, and a drive 910.

The input section 906 includes a keyboard, a mouse, and a microphone, for example. The output section 907 includes a display unit and speakers, for example. The recording section 908 is typically formed by a hard disk or a nonvolatile memory. The communication section 909 is typically constituted by a network interface. The drive 910 drives a removable medium 911 such as a magnetic disk, an optical disk, a magneto-optical disk, or a semiconductor memory.

In the computer 900 configured as described above, the CPU 901 performs the above-mentioned series of processing by loading appropriate programs from the ROM 902 or the recording section 908 into the RAM 903 via the input/output interface 905 and the bus 904 and by executing the loaded programs.

The programs to be executed by the computer 900 (CPU 901) may be recorded on the removable medium 911 such as packaged media when offered. The programs may also be offered via wired or wireless transmission media such as local area networks, the Internet, and digital satellite broadcasting.

On the computer 900, the programs may be installed into the recording section 908 from the removable medium 911 attached to the drive 910 via the input/output interface 905. The programs may also be installed into the recording section 908 after being received by the communication section 909 via wired or wireless transmission media. The programs may alternatively be preinstalled in the ROM 902 or in the recording section 908.

In this specification, the processes executed by the computer in accordance with programs need not be carried out chronologically as depicted in the flowcharts. That is, the processes performed by the computer according to programs may include those that are conducted parallelly or individually (e.g., parallel processes or object-oriented processes). The programs may be processed by a single computer (processor) or by multiple computers on a shared basis.

It should be understood that the present technology when embodied is not limited to the above-described embodiments and that various modifications, variations and alternatives may be made of the technology so far as they are within the scope of the appended claims or the equivalents thereof.

The present technology, when implemented, may be configured preferably as follows.

(1)

A receiving apparatus including:

a receiving section configured to receive a digital broadcast signal;

an acquiring section configured to acquire metadata transmitted by the digital broadcast signal, the metadata including first emergency information required to be announced urgently and display position information indicating whether there is second emergency information embedded in uncompressed video data, the display position information further indicating, if the second emergency information is embedded in the uncompressed video data, the display position of the second emergency information on a screen; and a processing section configured to process the metadata to determine whether the second emergency information is embedded in the uncompressed video data, the processing section further displaying, if the second emergency information is embedded in the uncompressed video data, the first emergency information at a position different from the display position of the second emergency information on the screen.

(2)

The receiving apparatus as stated in paragraph (1) above, in which the first emergency information is text information included in the metadata when transmitted; and the second emergency information is text information embedded in the video data when transmitted.

(3)

The receiving apparatus as stated in paragraph (2) above, in which the first emergency information includes a message serving as a caption of the information required to be announced urgently, and descriptive text describing details of the message.

(4)

The receiving apparatus as stated in paragraph (3) above, in which the message and the descriptive text are each displayed in a different layout.

(5)

The receiving apparatus as stated in any one of paragraphs (1) to (4) above, in which the metadata further includes display layout information about the display layout of the first emergency information; and the processing section causes the first emergency information to be displayed at a position different from the display position of the second emergency information on the screen only when the first emergency information is displayed overlaid on a video corresponding to the video data in accordance with the display layout information.

(6)

The receiving apparatus as stated in any one of paragraphs (1) to (5) above, in which the display position information indicates either coordinates or a region on the screen in which the second emergency information is to be displayed.

(7)

The receiving apparatus as stated in paragraphs (1) to (6) above, in which the receiving section receives the digital broadcast signal complying with an Internet Protocol (IP) transmission scheme.

(8)

A data processing method for use with a receiving apparatus, the data processing method including the steps of:

causing the receiving apparatus to receive a digital broadcast signal;

causing the receiving apparatus to acquire metadata transmitted by the digital broadcast signal, the metadata including first emergency information required to be announced urgently and display position information indicating whether there is second emergency information embedded in uncompressed video data, the display position information further indicating, if the second emergency information is embedded in the uncompressed video data, the display position of the second emergency information on a screen; and causing the receiving apparatus to process the metadata to determine whether the second emergency information is embedded in the uncompressed video data, the receiving apparatus being further caused to display, if the second emergency information is embedded in the uncompressed video data, the first emergency information at a position different from the display position of the second emergency information on the screen.

(9)

A transmitting apparatus including:

a generating section configured to generate metadata including first emergency information required to be announced urgently and display position information indicating whether there is second emergency information embedded in uncompressed video data, the display position information further indicating, if the second emergency information is embedded in the uncompressed video data, the display position of a receiving apparatus on a screen; and a transmitting section configured to transmit the metadata as a digital broadcast signal.

(10)

The transmitting apparatus as stated in paragraph (9) above, in which the first emergency information is text information included in the metadata when transmitted; and the second emergency information is text information embedded in the video data when transmitted.

(11)

The transmitting apparatus as stated in paragraph (10) above, in which the first emergency information includes a message serving as a caption of the information required to be announced urgently, and descriptive text describing details of the message.

(12)

The transmitting apparatus as stated in paragraph (11) above, in which the message and the descriptive text are each displayed in a different layout.

(13)

The transmitting apparatus as stated in any one of paragraphs (9) to (12) above, in which the metadata further includes display layout information about the display layout of the first emergency information.

(14)

The transmitting as stated in any one of paragraphs (9) to (13) above, in which the display position information indicates either coordinates or a region on the screen in which the second emergency information is to be displayed.

(15)

The transmitting apparatus as stated in any one of paragraphs (9) to (14) above, in which the receiving section receives the digital broadcast signal complying with an IP transmission scheme.

(16)

A data processing method for use with a transmitting apparatus, the data processing method including the steps of:

causing the transmitting apparatus to generate metadata including first emergency information required to be announced urgently and display position information indicating whether there is second emergency information embedded in uncompressed video data, the display position information further indicating, if the second emergency information is embedded in the uncompressed video data, the display position of a receiving apparatus on a screen; and causing the transmitting apparatus to transmit the metadata as a digital broadcast signal.

REFERENCE SIGNS LIST

1 Transmission system, 10-1, 10-2, 10 Transmitting apparatus, 20, 20-1, 20-2, 20-3 Receiving apparatus, 30 Radio tower, 40 EA server, 80 Transmission path, 90 Communication line, 101 EA parser, 102 Live content acquiring section, 103 Storage, 104 Component processing section, 105 Signaling processing section, 106 LCC processing section, 107 Encoder, 108 Multiplexer, 109 Modulating section, 110 RF section, 201 RF section, 202 Demodulating section, 203 Processing section, 204 Output section, 205 Communication I/F, 211 FW/HW section, 212 Component processing section, 213 MW section, 214 Browser, 221 Demultiplexer, 222 Decoder, 231 Parser, 232 Filter, 900 Computer, 901 CPU

The invention claimed is:

1. A receiving apparatus comprising:

circuitry configured to:

receive a digital broadcast signal including video data having emergency information embedded therein;

acquire emergency data transmitted in the digital broadcast signal, the emergency data including (i) first emergency information indicating a presence of the emergency information embedded in the video data and (ii) second emergency information indicating whether or not to maintain the video data with the emergency information embedded therein on a screen;

process the emergency data to determine whether or not to maintain the video data; and display the video data on the screen in accordance with the determination, wherein the video data having the emergency information embedded therein is scaled down when the second emergency information indicates not to maintain the video data such that the scaled down video data having the emergency information embedded therein does not overlap additional information included on the screen.

2. The receiving apparatus according to claim 1, wherein the first emergency information is emergency alert service identification information.

3. The receiving apparatus according to claim 2, wherein the second emergency information includes layout information.

4. The receiving apparatus according to claim 1, wherein the digital broadcast signal complies with an internet protocol (IP) transmission scheme.

5. The receiving apparatus according to claim 1, wherein the emergency information embedded in video data includes text information.

6. The receiving apparatus according to claim 5, wherein the determination of whether or not to maintain the video data is based on a determination of whether a description of a position of the text information is provided for a data element.

7. The receiving apparatus according to claim 1, wherein the additional information is not scaled down with the video data and the emergency information.

8. A data processing method for use with a receiving apparatus, the data processing method comprising:
   causing the receiving apparatus to receive a digital broadcast signal including video data having emergency information embedded therein;
   causing the receiving apparatus to acquire emergency data transmitted in the digital broadcast signal, the emergency data including (i) first emergency information indicating a presence of the emergency information embedded in the video data and (ii) second emergency information indicating whether or not to maintain the video data with the emergency information embedded therein on a screen;
   causing the receiving apparatus to process the emergency data to determine whether or not to maintain the video data; and
   causing the receiving apparatus to display the video data on the screen in accordance with the determination, wherein the video data having the emergency information embedded therein is scaled down when the second emergency information indicates not to maintain the video data such that the scaled down video data having the emergency information embedded therein does not overlap additional information included on the screen.

9. A transmitting apparatus comprising:
circuitry configured to:
generate emergency data including (i) first emergency information indicating a presence of emergency information embedded in video data and (ii) second emergency information indicating whether or not to maintain the video data on a screen; and
   transmit, in a digital broadcast signal, the video data having the emergency information embedded therein, wherein the video data having the emergency information embedded therein is scaled down when the second emergency information indicates not to maintain the video data such that the scaled down video data having the emergency information embedded therein does not overlap additional information included on the screen.

10. The transmitting apparatus according to claim 9, wherein the first emergency information is emergency alert service identification information.

11. The transmitting apparatus according to claim 10, wherein the second emergency information includes layout information.

12. The transmitting apparatus according to claim 9, wherein the digital broadcast signal complies with an IP transmission scheme.

13. A data processing method for use with a transmitting apparatus, the data processing method comprising:
   causing the transmitting apparatus to generate emergency data including (i) first emergency information indicating a presence of emergency information embedded in video data and (ii) second emergency information indicating whether or not to maintain the video data on a screen; and
   causing the transmitting apparatus to transmit, in a digital broadcast signal, the video data having the emergency information embedded therein, wherein the video data having the emergency information embedded therein is scaled down when the second emergency information indicates not to maintain the video data such that the scaled down video data having the emergency information embedded therein does not overlap additional information included on the screen.

* * * * *